United States Patent
Han

(10) Patent No.: US 9,952,985 B2
(45) Date of Patent: Apr. 24, 2018

(54) METHOD AND SYSTEM FOR COMMUNICATION BETWEEN DEVICES VIA AN INTERMEDIATE DEVICE

(71) Applicant: Samsung Electronics Co., Ltd., Suwon-si, Gyeonggi-do (KR)

(72) Inventor: Chung-suk Han, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 14/140,227

(22) Filed: Dec. 24, 2013

(65) Prior Publication Data

US 2014/0181335 A1 Jun. 26, 2014

(30) Foreign Application Priority Data

Dec. 24, 2012 (KR) .................. 10-2012-0152499
Apr. 10, 2013 (KR) .................. 10-2013-0039511

(51) Int. Cl.
| | | |
|---|---|---|
| *G06F 3/00* | (2006.01) | |
| *G06F 13/00* | (2006.01) | |
| *G06F 5/00* | (2006.01) | |
| *G06F 13/36* | (2006.01) | |
| *G01R 31/08* | (2006.01) | |
| *H04J 3/16* | (2006.01) | |
| *G06F 13/10* | (2006.01) | |
| *H04L 29/08* | (2006.01) | |
| *H04L 29/06* | (2006.01) | |
| *H04L 12/28* | (2006.01) | |

(52) U.S. Cl.
CPC ............ *G06F 13/10* (2013.01); *H04L 12/282* (2013.01); *H04L 12/2832* (2013.01); *H04L 67/2823* (2013.01); *H04L 69/08* (2013.01); *H04L 2012/2841* (2013.01); *H04L 2012/2849* (2013.01); *H04W 4/80* (2018.02)

(58) Field of Classification Search
CPC .................................. G06F 13/00; G06F 13/10
USPC .......... 710/33, 307, 315, 11, 16, 38; 455/15; 370/230, 469; 375/259
See application file for complete search history.

(56) References Cited

U.S. PATENT DOCUMENTS

| | | | | |
|---|---|---|---|---|
| 5,457,785 A | * | 10/1995 | Kikinis et al. ................. | 710/307 |
| 6,023,452 A | * | 2/2000 | Shiragaki ................. | H04B 1/74 |
| | | | | 370/227 |

(Continued)

FOREIGN PATENT DOCUMENTS

| | | |
|---|---|---|
| CN | 102474910 A | 5/2012 |
| KR | 10-2004-0017309 A | 2/2004 |

(Continued)

*Primary Examiner* — Farley Abad
*Assistant Examiner* — Henry W Yu
(74) *Attorney, Agent, or Firm* — Jefferson IP Law, LLP

(57) ABSTRACT

A method and a system in which a second device provides a service along with an external device via a first device is provided. The method includes, when a service connection to at least one external device has failed, searching for the first device that will relay service data for the external device, transmitting a relay request signal to the first device, and transmitting the service data for the external device to the first device, wherein the transmitted service data is converted by the first device, and wherein the converted service data is provided to the external device.

34 Claims, 19 Drawing Sheets

(56) References Cited

U.S. PATENT DOCUMENTS

| | | | |
|---|---|---|---|
| 6,570,852 B1* | 5/2003 | Suzuki | H04L 1/1678 370/230 |
| 8,200,881 B2* | 6/2012 | Lydon et al. | 710/315 |
| 8,542,658 B2 | 9/2013 | Laroia et al. | |
| 2001/0018328 A1* | 8/2001 | Ohkura et al. | 455/15 |
| 2003/0140180 A1* | 7/2003 | Brown | G06F 9/547 719/330 |
| 2003/0202610 A1* | 10/2003 | Terada | H03M 5/145 375/259 |
| 2003/0236865 A1* | 12/2003 | Anthe et al. | 709/220 |
| 2005/0244158 A1* | 11/2005 | Luft | H04B 10/032 398/59 |
| 2006/0028998 A1* | 2/2006 | Lioy | H04L 69/167 370/252 |
| 2006/0171302 A1* | 8/2006 | Tallet | H04L 12/4625 370/225 |
| 2006/0239297 A1* | 10/2006 | Rao | H04L 29/12047 370/469 |
| 2006/0268907 A1 | 11/2006 | Lee et al. | |
| 2007/0263248 A1* | 11/2007 | Oshima | G06F 3/1204 358/1.15 |
| 2008/0313319 A1* | 12/2008 | Geffin | H04L 43/0817 709/223 |
| 2010/0097941 A1* | 4/2010 | Carlson | H04L 12/40195 370/245 |
| 2010/0100735 A1 | 4/2010 | Rajan et al. | |
| 2010/0121968 A1 | 5/2010 | Clark | |
| 2011/0032817 A1* | 2/2011 | Qian | H04L 41/147 370/225 |
| 2011/0047266 A1 | 2/2011 | Yu et al. | |
| 2011/0137436 A1 | 6/2011 | Chang | |
| 2011/0231862 A1* | 9/2011 | Walsh | 719/318 |
| 2012/0083208 A1 | 4/2012 | Giles et al. | |
| 2012/0166886 A1* | 6/2012 | Shankar | G06F 11/2028 714/43 |
| 2012/0259612 A1* | 10/2012 | Lyons et al. | 703/21 |
| 2013/0310070 A1 | 11/2013 | Anderson et al. | |
| 2013/0346642 A1* | 12/2013 | Millen | H04W 4/00 710/20 |
| 2014/0095655 A1* | 4/2014 | Chatterjee | H04L 67/2809 709/217 |

FOREIGN PATENT DOCUMENTS

| | | |
|---|---|---|
| KR | 10-2006-0123974 A | 12/2006 |
| KR | 10-2010-0130247 A | 12/2010 |
| KR | 10-2012-0054010 A | 5/2012 |
| WO | 2011-000090 A | 1/2011 |

* cited by examiner

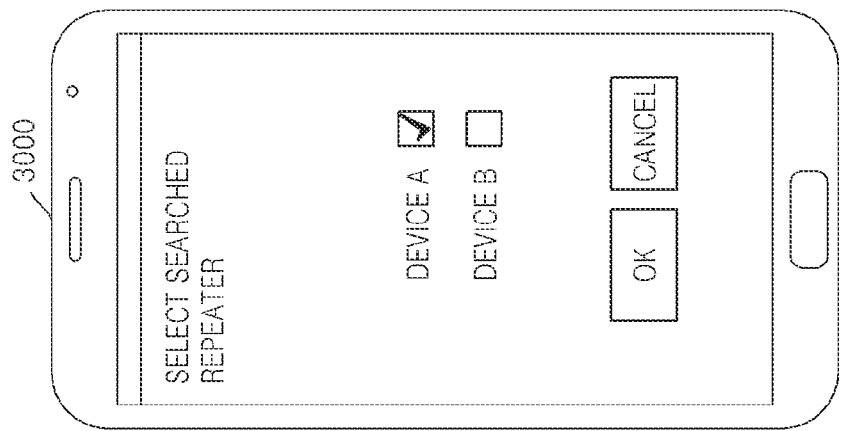
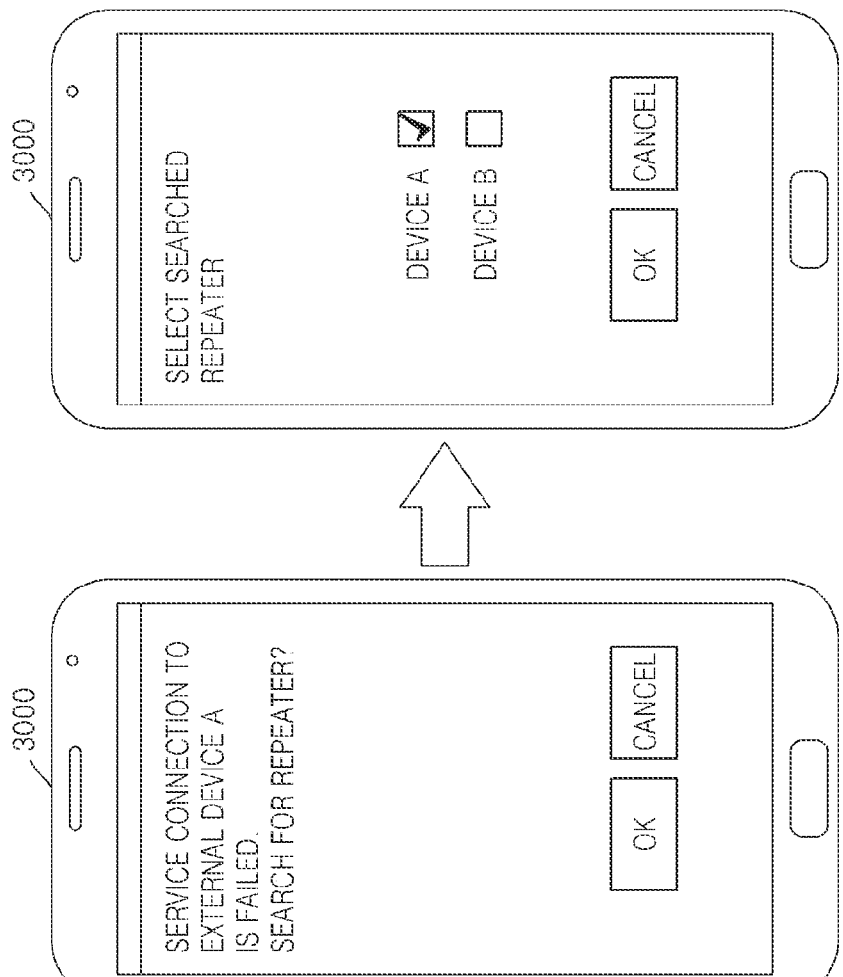
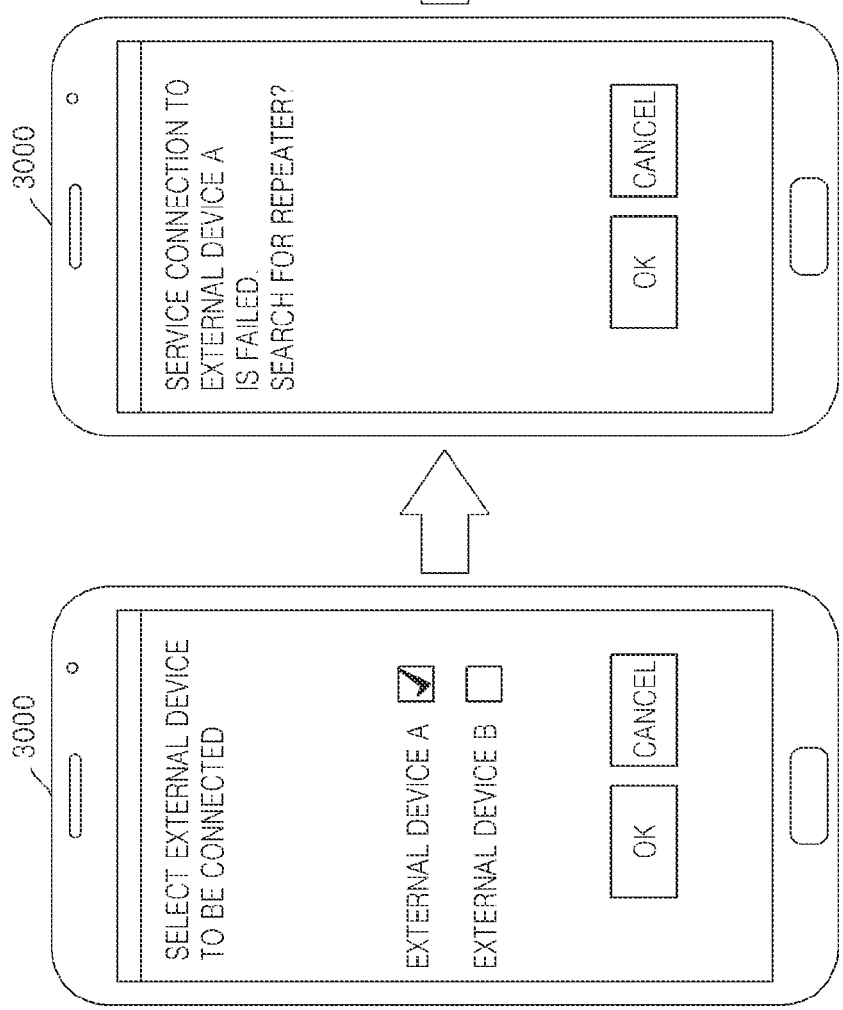

METHOD AND SYSTEM FOR COMMUNICATION BETWEEN DEVICES VIA AN INTERMEDIATE DEVICE

CROSS-REFERENCE TO RELATED APPLICATION(S)

This application claims the benefit under 35 U.S.C. § 119(a) of a Korean patent application filed on Dec. 24, 2012 in the Korean Intellectual Property Office and assigned Serial number 10-2012-0152499, and a Korean patent application filed on Apr. 10, 2013 in the Korean Intellectual Property Office and assigned Serial number 10-2013-0039511, the entire disclosures of both of which are hereby incorporated by reference.

TECHNICAL FIELD

The present disclosure relates to a communication method and system for transmitting and receiving service data between devices via a repeater.

BACKGROUND

As devices, such as smart phones and tablet Personal Computers (PCs), become ubiquitous devices, peripheral devices, such as external devices and/or accessories that may be used together with the above-stated devices have been variously developed. The peripheral device may operate together with a specific application that is executed in the above-stated device. Thus, the above-stated device is referred to as a host device of peripheral devices such as external devices and/or accessories.

As various peripheral devices have been developed and communication technologies are diversified, service protocols of the peripheral devices may be different from each other. Thus, technology for a service connection between peripheral devices having different service protocols, and/or between a peripheral device and a host device which have different service protocols, is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a service connection between devices having different service protocols.

Another aspect of the present disclosure is to provide a service connection between devices having different service protocols.

Another aspect of the present disclosure is to provide a non-volatile computer readable recording medium having recorded thereon a program for executing the method.

Additional aspects will be set forth in part in the description which follows and, in part, will be apparent from the description, or may be learned by practice of the presented various embodiments.

In accordance with an aspect of the present disclosure, a method, in which a second device provides a service along with an external device via a first device is provided. The method includes when a service connection to at least one external device has failed, searching for the first device that will relay service data for the external device, transmitting a relay request signal to the first device, and transmitting the service data for the external device to the first device, wherein the transmitted service data is converted by the first device, and wherein the converted service data is provided to the external device.

In accordance with another aspect of the present disclosure, a method, in which a first device relays service data between a second device and an external device is provided. The method includes receiving, from the second device, a relay request signal for requesting a relay of service data for at least one external device, comparing a service protocol of the external device and a service protocol of the second device, converting service data received from the second device into a form suitable for the service protocol of the external device when the service protocol of the external device is different from that of the second device, and transmitting the converted service data to the external device.

In accordance with another aspect of the present disclosure, a second device for providing a service along with an external device via first device is provided. The second device includes a memory in which at least one program is stored, and a processor configured to execute the at least one program to provide the service along with the external device via the first device, wherein the at least one program includes commands executing when a service connection to at least one external device has failed, searching for the first device that will relay service data for the external device, transmitting a relay request signal to the first device, and transmitting the service data for the external device to the first device, wherein the transmitted service data is converted by the first device, and wherein the converted service data is provided to the external device.

In accordance with another aspect of the present disclosure, a first device for relaying service data between a second device and an external device is provided. The first device includes a memory in which at least one program is stored, and a processor configured to execute the at least one program to relay the service data between the second device and the external device, wherein the at least one program includes commands executing: receiving, from the second device, a relay request signal for requesting a relay of service data for at least one external device, comparing a service protocol of the external device and a service protocol of the second device, converting service data received from the second device into a form suitable for the service protocol of the external device when the service protocol of the external device is different from that of the second device, and transmitting the converted service data to the external device.

In accordance with another aspect of the present disclosure, a non-transitory computer-readable recording medium having recorded thereon a program for executing the method in which a second device provides a service along with an external device via a first device.

In accordance with another aspect of the present disclosure, a non-transitory computer-readable recording medium having recorded thereon a program for executing the method in which a first device relays service data between a second device and an external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 15A, 15B, and 15C are diagrams illustrating an example of a user interface via which a user makes a second device attempt a connection to an external device and search for a repeater according to an embodiment of the present disclosure;

The same reference numerals are used to represent the same elements throughout the drawings.

DETAILED DESCRIPTION

Figure 1:
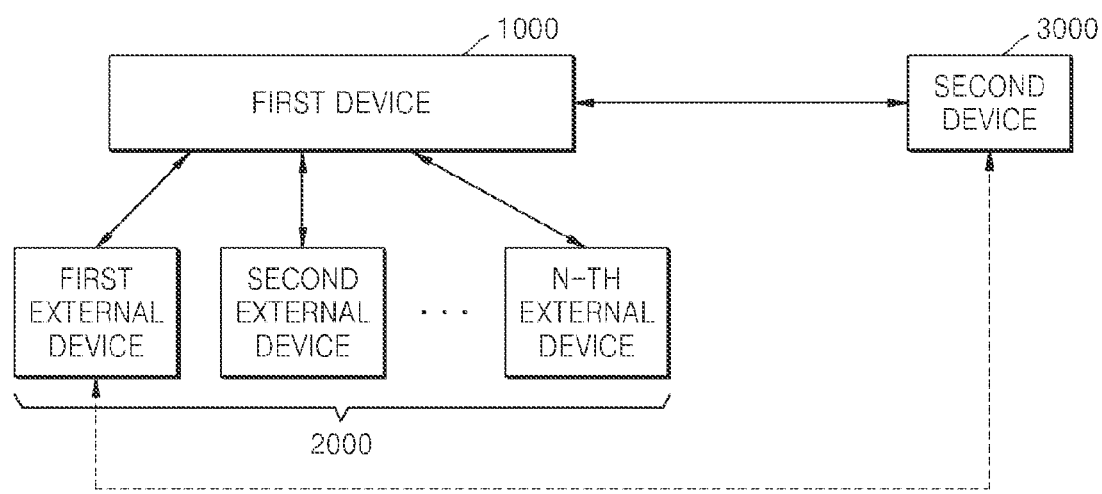
FIG. 1 is a schematic block diagram of an external device control system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first," "second," etc., may be used to describe various components, such components must not be limited to the above terms. The above terms are used only to distinguish one component from another.

The terms used in the present specification are merely used to describe particular various embodiments, and are not intended to limit the present disclosure. All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the present disclosure, a physical connection between two devices means a state in which the two devices are connected to each other so that the two devices may transmit and receive data to and from each other. For example, two devices may be connected to each other via at least one of Bluetooth communication, WIFI communication, Near Field Communication (NFC), and/or any other similar and/or suitable communication method, scheme, and/or protocol.

A service connection between two devices means a state in which the two devices are connected to each other so that the two devices may execute a service by using data that is transmitted and/or received between the two devices. When two devices are connected to each other to provide the service connection, each of the two devices may use a function of each device, which is provided from an upper layer of a layer performing the physical connection.

In the present disclosure, a host device is a device that is not required to be connected to any other device to provide a service. The hose device may independently execute an application although the host device is not connected to any other device, and may provide a service via the executed application.

A peripheral device is a device that is required to be connected to any other device to provide a service. The peripheral device may not independently execute an application to provide a service. The peripheral device may be connected to the host device to receive a control command from the host device, and may provide a service based on a received control command. Also, the peripheral device may be dependent on the host device or any other peripheral device.

However, the host device and the peripheral device are not limited to the above description, and may vary according to a type of service and an application. For example, a specific device may operate as the host device or the peripheral device according to a type of service and an application.

The host device and the peripheral device may from a topology. The topology may refer to, describe, and/or correspond to connections formed between devices and/or nodes of a network. Examples of the topology include a physical topology and a logical topology. The topology may be determined according to a physical or logical connection between devices included in a topology structure. For example, the topology may be classified from the other topology according to at least one of a connection relationship between devices, a connection method of devices, a data transmission speed between devices, a data flow between devices, a type of signal transferred between devices, a type of application installed in a device, and a relationship between applications installed in a device, but is not limited thereto and the topology may be classified according to any suitable criteria and/or characteristics of a network.

In the present disclosure, services are functions that are provided via data transmission and/or reception between devices, and examples of the services may include a video playback service, a music playback service, a device monitoring service, a game service, a printing service, a chatting service, a photography service, an article writing service, an education service, a video conferencing service, an equipment control service, and a content sharing service. However, the present disclosure is not limited thereto, and the services may be any similar and/or suitable service that may be provided via data transmission and/or reception.

In the present disclosure, service data, which is transmitted and/or received between devices to provide a service, may be data related to a control of at least one of an external device and/or a second device. However, the present disclosure is not limited thereto.

As used herein, the term "and/or" includes any and all combinations of one or more of the associated listed items. Expressions such as "at least one of," when preceding a list of elements, modify the entire list of elements and do not modify the individual elements of the list.

Reference will now be made in detail to various embodiments, examples of which are illustrated in the accompanying drawings, wherein like reference numerals refer to the like elements throughout.

FIG. 1 is a schematic block diagram of an external device control system according to an embodiment of the present disclosure.

Referring to FIG. 1, the external device control system includes a first device 1000, at least one external device 2000, and a second device 3000. The first device 1000 may be a host device, and the at least one external device 2000 may be a peripheral device that is connected to the host device and controlled by the host device.

The first device 1000 is connected to the external device 2000 and may control the external device 2000, and may relay data transmission between the external device 2000 and the second device 3000.

The second device 3000 is physically connected to the external device 2000, and attempts to establish a service connection with the external device 2000. When the second device 3000 fails to establish the service connection with the external device 2000, the second device 3000 may search for the first device 1000 connected to the external device 2000 and may be connected to the first device 1000. The second device 3000 may request the first device 1000 to relay data to the external device 2000.

In addition, the second device 3000 may transmit and/or receive data to and/or from the external device 2000 as a host device or a peripheral device.

At least one of the first device 1000, the external device 2000, and the second device 3000 may be, for example, a smart phone, a mobile phone, a Personal Digital Assistant (PDA), a laptop, a media player, a Personal Computer (PC), a Global Positioning System (GPS) device, a mobile or non-mobile computing device. However, the present disclosure is not limited thereto, and the at least one of the first device 1000, the external device 2000, and the second device 3000 may be any other similar and/or suitable electronic device.

At least one of the first device 1000, the external device 2000, and the second device 3000 may include a home appliance and/or any of various devices installed in a house. For example, at least one of the first device 1000, the external device 2000, and the second device 3000 may include a television, a lighting fixture, a refrigerator, an audio apparatus, a washing machine, an oven, a gas stove, a home gateway, a game device, an electronic blackboard, a touch table. However, the present disclosure is not limited thereto, and the at least one of the first device 1000, the external device 2000, and the second device 3000 may be any other similar and/or suitable home appliance, device, element, apparatus, and item.

Figure 2:
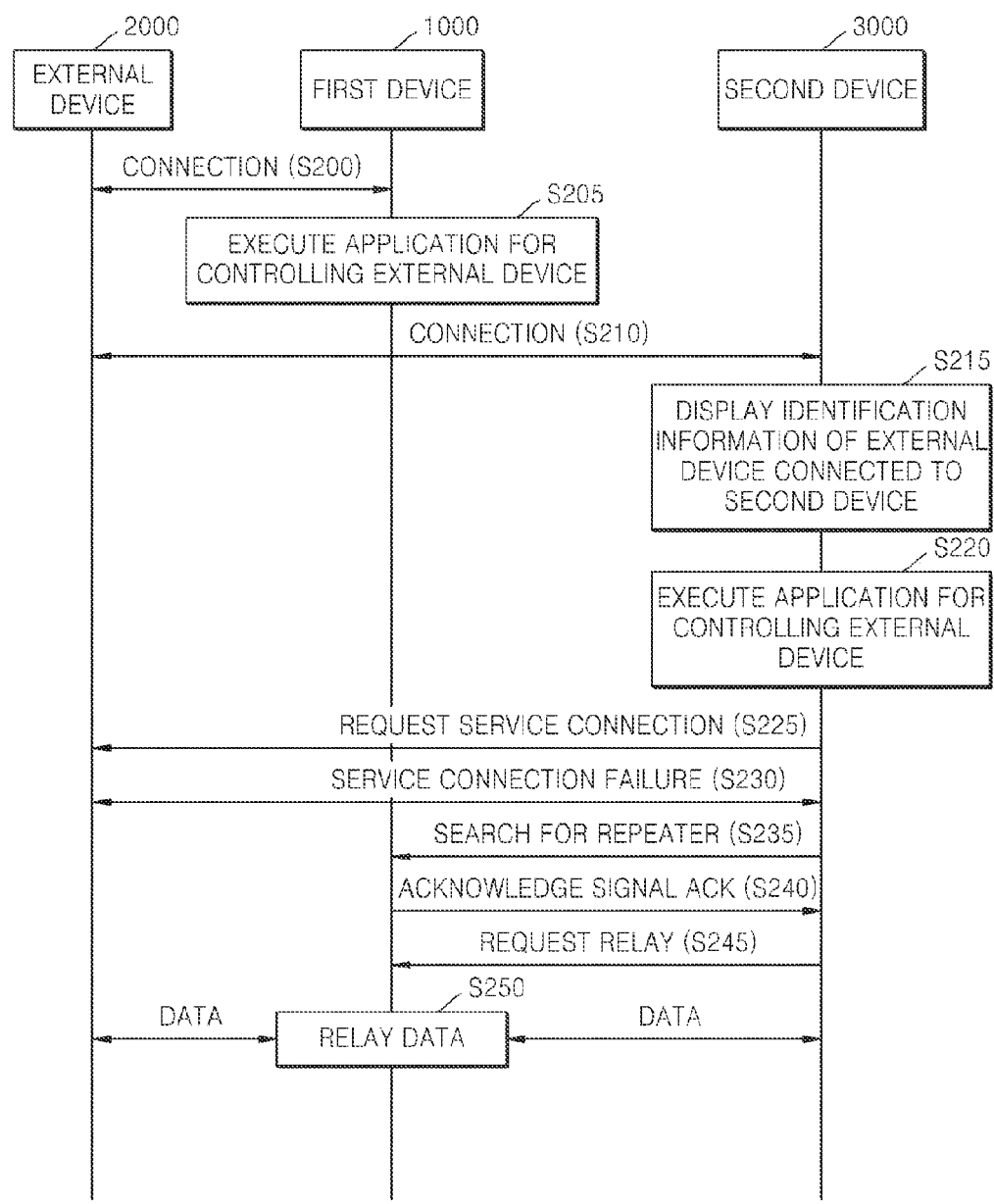
FIG. 2 is a flowchart illustrating a method in which a second device controls an external device connected to a first device in the external device control system of FIG. 1 according to an embodiment of the present disclosure.

FIG. 2 is a flowchart illustrating a method in which a second device controls an external device connected to the first device in the external device control system of FIG. 1 according to an embodiment of the present disclosure.

In operation S200, the first device 1000 and the external device 2000 form a connection to each other. The first device 1000 and the external device 2000 may be physically connected to each other, however the present disclosure is not limited thereto, and the first device 1000 and the external device 2000 may be connected according to a wired and/or wireless connection. As the first device 1000 and the external device 2000 approach each other, the first device 1000 and the external device 2000 may sense an occurrence of a first local area communication. The external device 2000 may transmit an identification value of the external device 2000 to the first device 1000 via the first local area communication. The identification value of the external device 2000 may include, for example, a Service Set Identifier (SSID), a model name, a product number, a user ID of the external device 2000, and any other similar and/or suitable information. However, the present disclosure is not limited thereto.

The external device 2000 may transmit information for connection to a second local area communication and may transmit application information related to the external device 2000 to the first device 1000, via the first local area communication. Examples of the first local area communication and a second local area communications may include an NFC, a Bluetooth communication, and a WIFI communication. However, the present disclosure is not limited thereto. The first local area communication and the second local area communication may be the same as each other, but the present disclosure is not limited thereto, and the first and second local area communications may be any suitable and/or similar type of communications.

The application information related to the external device 2000 may be information about an application for providing a service via the external device 2000. For example, the application information may include information about an application installed in the external device 2000 and information about an application for controlling the external device 2000. However, the present disclosure is not limited thereto.

In operation S205, the first device 1000 executes an application for controlling the external device 2000. The first device 1000 may be installed with the application for controlling the external device 2000 to execute the installed application, based on the application information received from the external device 2000. When the first device 1000 receives an application file, as the application information, from the external device 2000, the first device 1000 may execute the received application file. When the first device 1000 receives a link address for downloading an application file, the first device 1000 may download an application file by using the received link address and may execute the downloaded application file.

When the first device 1000 may normally transmit and/or receive service data to and from the external device 2000 by using the executed application, a service connection between the first device 1000 and the external device 2000 is completed.

In operation S210, the second device 3000 and the external device 2000 are connected to each other. The second device 3000 and the external device 2000 may be physically connected to each other. However, the present disclosure is not limited thereto, and the external device 2000 and the second device 3000 may be connected to each other via a wired and/or a wireless connection.

As the second device 3000 and the external device 2000 approach each other, the second device 3000 and the external device 2000 may sense the occurrence of the first local area communication. The external device 2000 may transmit the identification value of the external device 2000 to the first device 1000 via the first local area communication.

The external device 2000 may transmit information for connection to the second local area communication and application information related to the external device 2000 to the second device 3000, via the first local area communication. Examples of the first and second local area communications may include an NFC, a Bluetooth communication, and a WIFI communication. However, the present disclosure is not limited thereto. The first local area communication and the second local area communication may be the same as each other, but the present disclosure is not limited thereto.

The application information related to the external device 2000 may be information about an application for providing a service via the external device 2000. For example, the application information may include information about an application installed in the external device 2000 and information about an application for controlling the external device 2000. However, the present disclosure is not limited thereto.

In operation S215, the second device 3000 displays identification information, i.e., the identification value, of the external device 2000 connected to the second device 3000. The second device 3000 may display the identification value received from the external device 2000 on a screen of the second device 3000.

In operation S220, the second device 3000 executes an application for controlling the external device 2000. The second device 3000 may execute the application for controlling to the external device 2000 based on a user input for connection with the external device 2000.

The second device 3000 may be installed with the application for controlling the external device 2000 to execute the installed application, based on the application information received from the external device 2000. When the second device 3000 receives an application file, as the application information, from the external device 2000, the second device 3000 may execute the received application file. When the second device 3000 receives a link address for downloading an application, the second device 3000 may download an application file by using the received link address and may execute the downloaded application file.

In operation S225, the second device 3000 requests a service connection from the external device 2000. The second device 3000 may request the service connection from the external device 2000 by using the application executed in operation S220.

In operation S230, a service connection between the second device 3000 and the external device 2000 has failed, or in other words, the service connection between the second device 3000 and the external device 200 is not established. When a service protocol of the second device 3000 is different from that of the external device 2000, the service connection between the second device 3000 and the external device 2000 may be failed. The service protocol of the second device 3000 and the service protocol of the external device 2000 may be distinguished from each other according to types of Operating Systems (OSs) respectively installed in the second device 3000 and external device 2000, types of services that are provided by the second device 3000 and external device 2000, and formats of data that are used by the second device 3000 and external device 2000.

For example, when the OS installed in the second device 3000 is different from that installed in the external device 2000, and thus the service protocol and the data format of the second device 3000 are different from those of the external device 2000, then the service connection between the second device 3000 and the external device 2000 may be failed. In addition, when a communication method of the second device 3000 is different from that of the external device 2000, a type of service that is provided from the second device 3000 is different from that which is provided from the external device 2000, or a type of platform that is used in the second device 3000 is different from that which is used in the external device 2000, then the service connection between the second device 3000 and the external device 2000 may be failed.

In operation S235, the second device 3000 searches for a repeater. When the service connection between the second device 3000 and the external device 2000 has failed, the second device 3000 may search for a repeater. The second device 3000 may check the failure of the service connection to the external device 2000, and then may search for the first device 1000 that will relay service data to the external device 2000.

The service data, which is transmitted and received between devices to provide a service, may be data related to control of at least one of the external device 2000 and the second device 1000. For example, the service data may be data generated by an application related to control of the external device 2000 or data generated by an application related to control of the second device 3000. However, the present disclosure is not limited thereto.

In operations S210 through S230, the case in which the service connection has failed after the second device 3000 is physically connected to the external device 2000, receives the application information received from the physically connected external device 2000, and attempts the service connection to the external device 2000 by using the application installed based on the application information has been explained. However, the present disclosure is not limited thereto.

As the second device 3000 is physically connected to the external device 2000, the second device 3000 may determine whether the service connection to the external device 2000 is possible, based on the identification value of the external device 2000 which is received from the external device 2000. In this case, the second device 3000 may determine a type of service protocol and a data format that are used in the external device 2000, based on the identification value of the external device 2000. Also, the second device 3000 may determine whether the service connection to the external device 2000 is possible, by comparing the determined service protocol and data format of the external device 2000 with a service protocol and a data format of the second device 3000.

In operation S235, the second device 3000 may broadcast device information of the second device 3000 and device information of the external device 2000 to peripheral devices. The second device 3000 may broadcast information about the service protocol and the data format, which are used in the second device 3000, and information about the service protocol and the data format, which are used in the external device 2000, to the peripheral devices.

According to another embodiment of the disclosure, the second device 3000 may not provide information about the external device 2000 to the first device 1000, and may provide only information about a type of service to be used in the second device 3000 and a service protocol of the second device 3000 to the first device 1000. In this case, the first device 1000 may determine the external device 2000 based on the type of service to be used in the second device 3000 and the service protocol of the second device 3000.

In operation S240, the first device 1000 transmits an acknowledge signal ACK to the second device 3000. The first device 1000 may transmit the acknowledge signal ACK to the second device 3000 in response to a relay request of the second device 3000. In this case, the first device 1000 may receive the information about the service protocol and the data format, which are used in the second device 3000, and the information about the service protocol and the data format, which are used in the external device 2000, from the second device 3000, and may determine whether the first device 1000 may relay the transmission of service data between the external device 2000 and the second device 3000 based on the received information.

In operation S245, the second device 3000 requests a relay of service data from the first device 1000 which have transmitted the acknowledge signal ACK.

In operation S250, the first device 1000 relays data that is transmitted between the second device 3000 and the external device 2000. The first device 1000 may convert service data, which is received from the second device 3000, into a form suitable for the external device 2000, and may transmit the converted service data to the external device 2000. Also, the first device 1000 may convert service data, which is received from the external device 2000, into a form suitable for the second device 3000, and may transmit the converted service data to the first device 1000.

Figure 3:
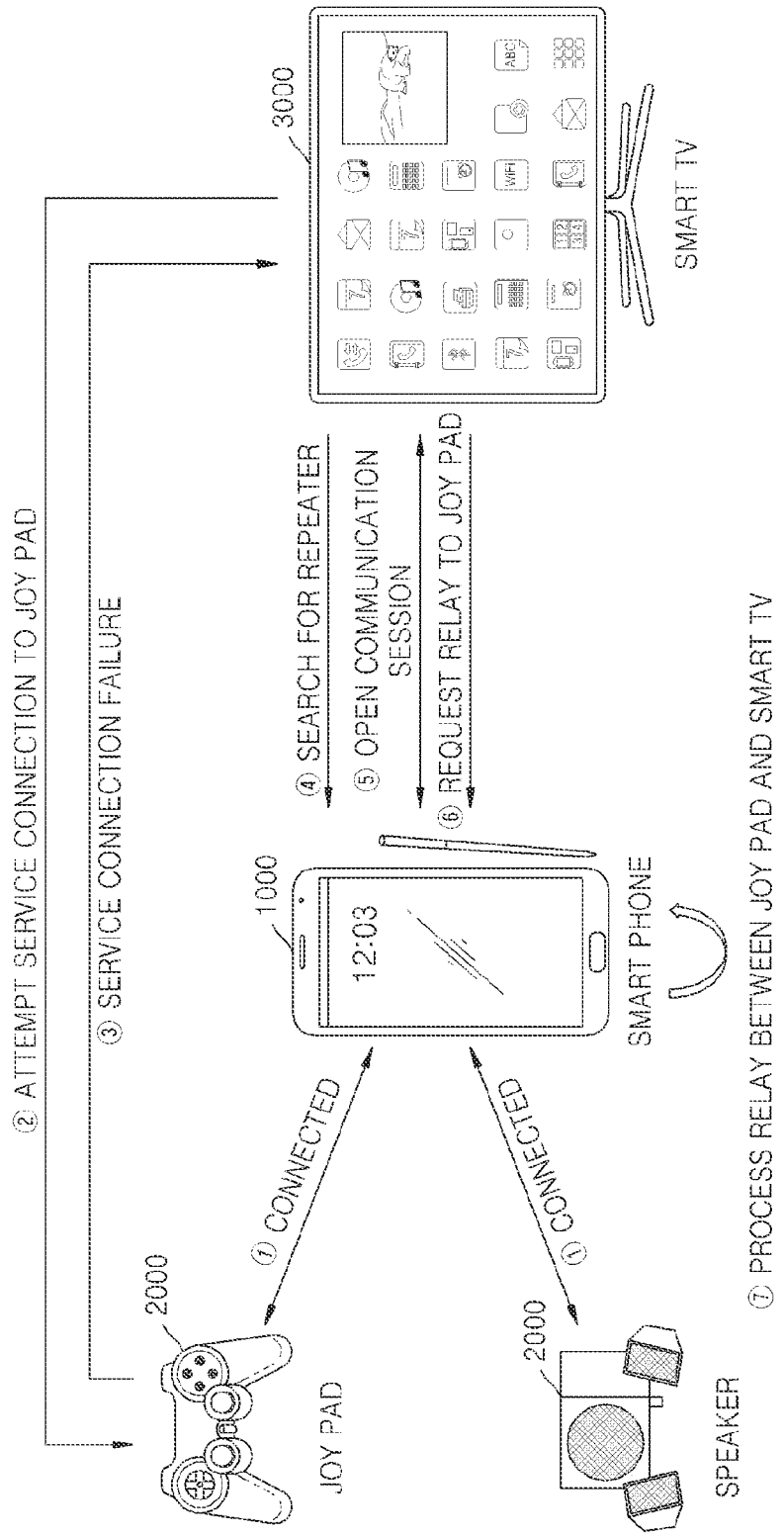
FIG. 3 is a diagram illustrating an example in which a second device controls an external device connected to a first device in the external device control system of FIG. 1 according to an embodiment of the present disclosure.

FIG. 3 is a diagram illustrating an example in which a second device controls an external device connected to a first device in the external device control system of FIG. 1 according to an embodiment of the present disclosure.

Referring to FIG. 3, a smart phone may be the first device 1000, a joy pad and a speaker each may be the external device 2000, and a smart TV may be the second device 3000.

The first device 1000 is connected to the external devices 2000 to provide a physical connection and a service connection, and the first device 1000 and the external devices 2000 may provide a service to a user by transmitting and receiving service data to and from each other.

Next, the second device 3000 may attempt the service connection to the external device 2000, that is the joy pad, and may search for a repeater when the service connection has failed. Next, a communication session between the first device 1000 and the second device 3000 may be opened based on an acknowledge signal ACK from the first device 1000. In addition, the first device 1000 may relay service data between the second device 3000 and the external device 1000, which is the joy pad, in response to a relay request of the second device 3000.

Figure 4:
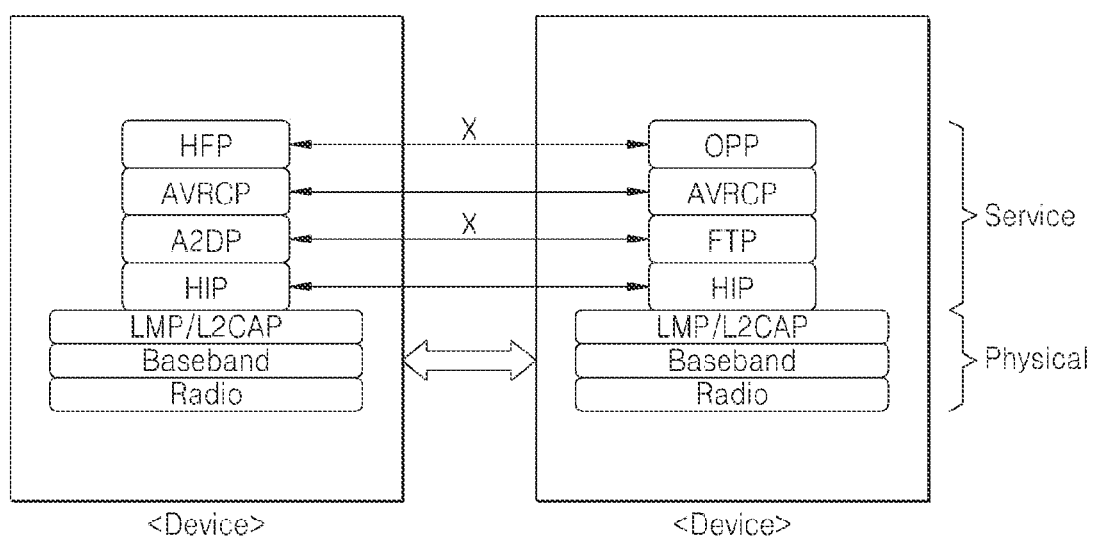
FIG. 4 is a diagram illustrating an example of a physical connection and service connection between devices via Bluetooth communication according to an embodiment of the present disclosure.

FIG. 4 is a diagram illustrating an example of a physical connection and service connection between devices via a Bluetooth communication according to an embodiment of the present disclosure.

Referring to FIG. 4, two devices illustrated in FIG. 4 may be two selected from among the first device 1000, the second device 3000, and the external device 2000.

The physical connection between two devices means a state in which the two devices are connected to each other so that the two devices may transmit and/or receive data to and from each other. For example, the two devices may be connected to each other via the Bluetooth communication. In addition, the two devices using the Bluetooth communication may be physically connected to each other via a physical layer illustrated in FIG. 4.

The service connection between two devices means a state in which the two devices are connected to each other so that the two devices may execute a service by using data that is transmitted and received between the two devices. When the two devices are connected to each other to provide the service connection, each of the two devices may use a function of each device which is provided from an upper layer of a layer performing the physical connection. In addition, the two devices using the Bluetooth communication may be connected to each other via a service layer illustrated in FIG. 4.

Figure 5:
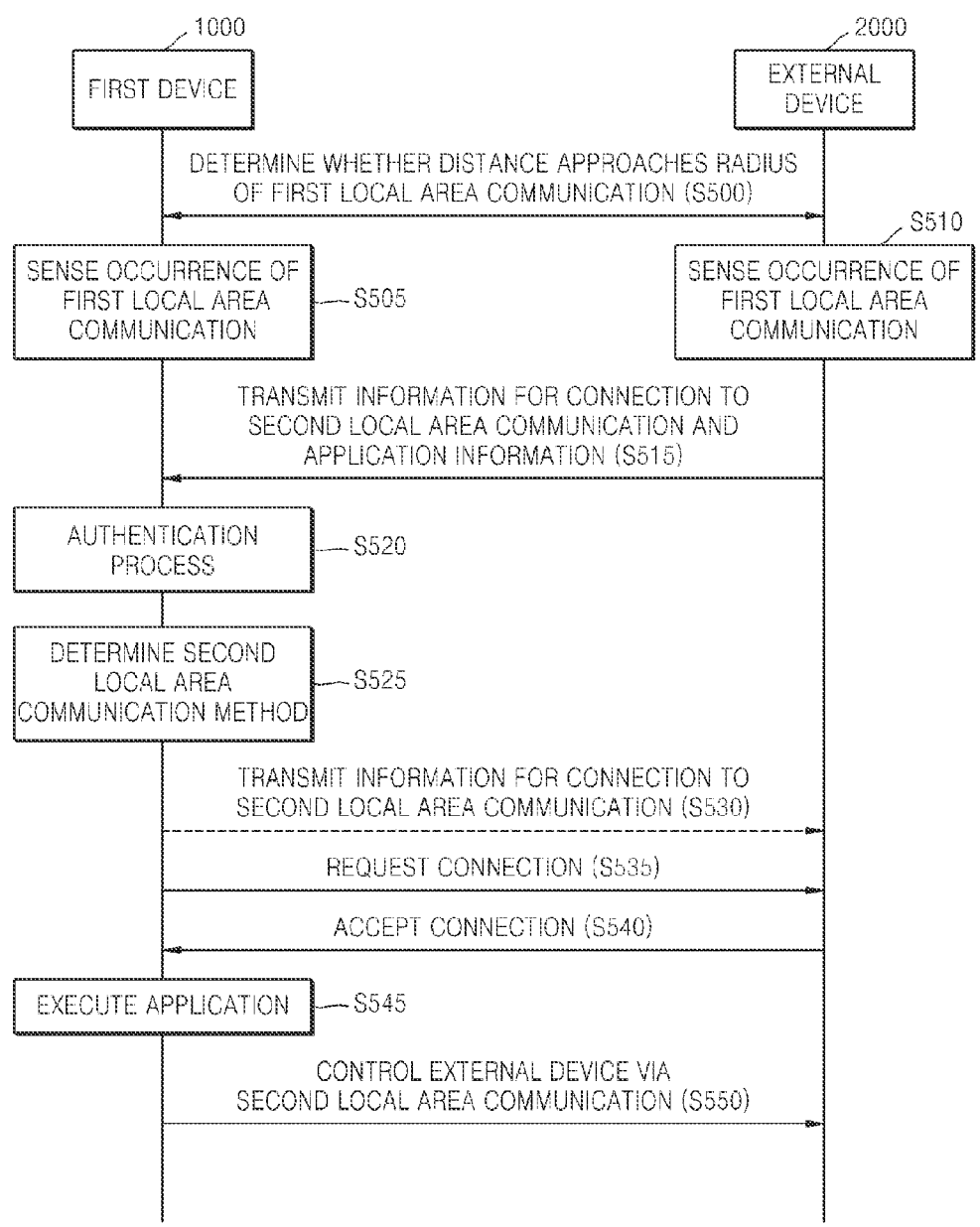
FIG. 5 is a diagram illustrating an example in which two devices are connected to each other via Near Field Communication (NFC) and another communication method according to an embodiment of the present disclosure.

FIG. 5 is a diagram illustrating an example in which two devices are connected to each other via an NFC communication and another communication method according to an embodiment of the present disclosure.

Referring to FIG. 5, a case in which the first device 1000 and the external device 2000 are connected to each other is described.

In operation S500, it is determined whether a distance between the first device 1000 and the external device 2000 approaches a radius of a first local area communication. When the distance between the first device 1000 and the external device 2000 approaches the radius of the first local area communication, the first device 1000 and the external device 2000 sense the occurrence of the first local area communication in operations S505 and S510. In the embodiment of FIG. 5, the first local area communication may be the NFC communication.

In operation S515, the external device 2000 transmits information for a connection to a second local area communication and transmits application information related to the external device 2000 to the first device 1000, based on the NFC communication.

In operation S520, the first device 1000 performs an authentication process with respect to the external device 2000. The authentication process may be performed by authenticating previously appointed authentication information received from the external device 2000. Thus, in operation S520, the authentication information should be received from the external device 2000. If, in operation S520, the authentication information is not received from the external device 2000 and the authentication process for the external device 2000 is not performed, then operation S520 may be omitted.

However, if the authentication process for the external device 2000 is performed, then the first device 1000 may not perform a next process when the authentication information is not received from the external device 2000 or may not perform the next process when wrong authentication information is received from the external device 2000.

In operation S525, the first device 1000 determines a second local area communication method of the external device 2000 based on the information for connection to the second local area communication which is received from the external device 2000.

FIG. 5 illustrates a case in which the external device 2000 directly communicates with the first device 1000 via the second local area communication. Thus, in operation S530, the first device 1000 may transmit information for connection to the second local area communication, which may include information of the first device 1000, which is needed when requesting a direct communication between devices, to the external device 2000 by using the NFC communication method. In this regards, the external device 2000 may first attempt a direct communication with the first device 1000 by using the information of the first device 1000 later.

However, operation S530 may not be performed so that only the first device 1000 may attempt the direct communication between devices.

In operation S535, the first device 1000 transmits a request for a connection to the external device 2000 based on the information for the connection to the second local area communication, which was received from the external device 2000. When a signal indicating acceptance of the connection is received from the external device 2000, in operation S540, then the first device 1000 executes an application in operation S545.

In operation S550, the first device 1000 controls the external device 2000 via a repeater based on the executed application. As the first device 1000 is connected to the external device 2000 to provide a service connection, the first device 1000 may control the external device 2000 by using the executed application and may provide a service together with the external device 2000.

Figure 6:
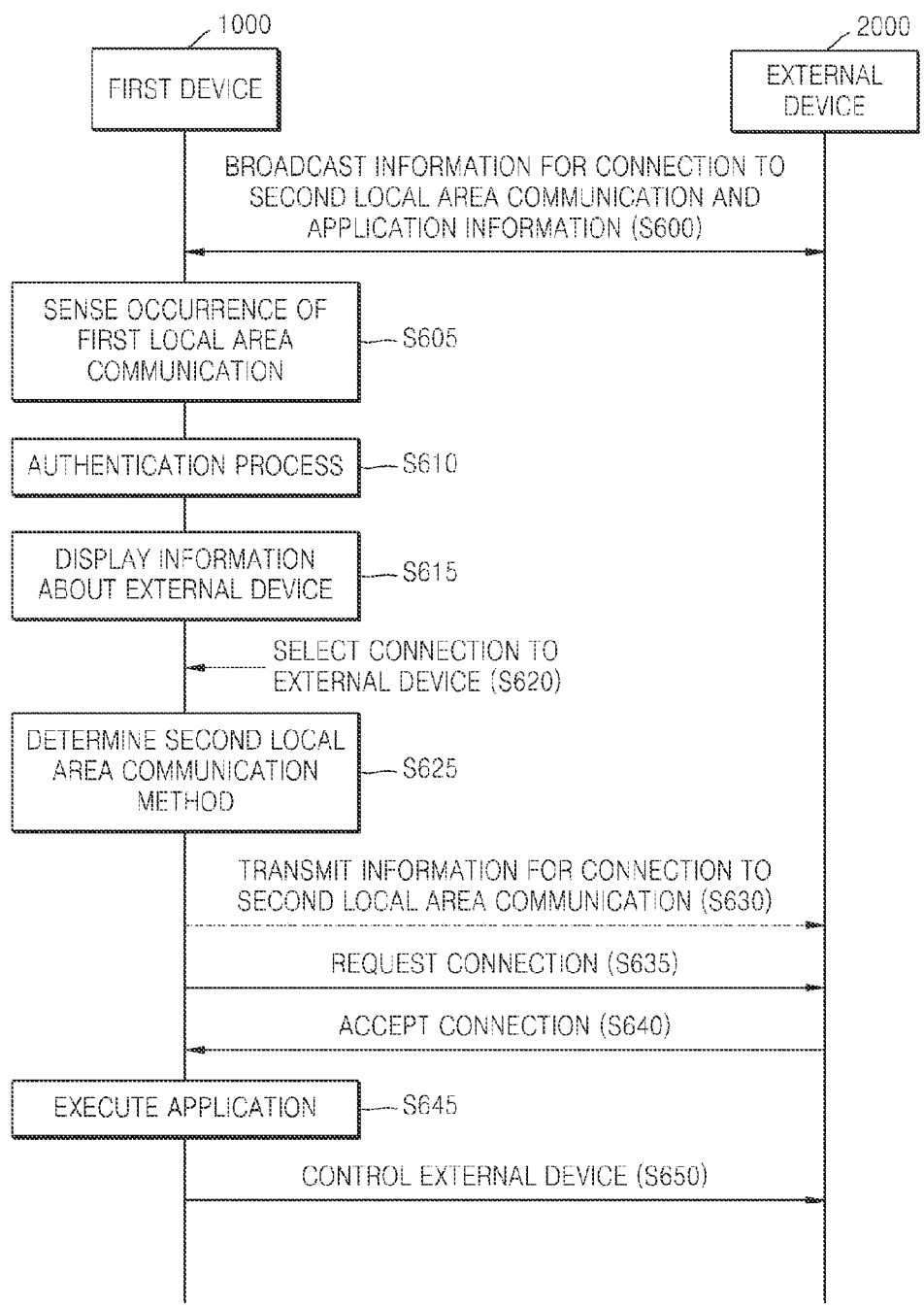
FIG. 6 is a diagram illustrating an example in which two devices are connected to each other via Bluetooth Low Energy (BLE) communication and another communication method according to an embodiment of the present disclosure.

FIG. 6 is a diagram illustrating an example in which two devices are connected to each other via a Bluetooth Low Energy (BLE) communication and another communication method according to an embodiment of the present disclosure.

Referring to FIG. 6, a case in which the first device 1000 and the external device 2000 are connected to each other is described.

In operation S600, the external device 2000 broadcasts information for a connection to a second local area communication and application information related to the external device 2000 via the BLE communication.

In operation S605, when the broadcasted information is received, the first device 1000 senses the occurrence of a first local area communication. As shown in FIG. 6, the first local area communication may be the BLE communication. In convenience of explanation, a case in which operation S600 and operation S605 are different operations is illustrated in FIG. 6, however, the present disclosure is not limited thereto, and operation S600 and operation S605 may simultaneously occur. That is, the first device 1000 may sense the occurrence of the first local area communication at the same time when a signal broadcasted from the external device 2000 is received. In operation S600, the external device 2000 may not broadcast the application information.

In operation S610, the first device 1000 performs an authentication process with respect to the external device 2000. The authentication process may be performed by authenticating previously appointed authentication information received from the external device 2000. Thus, in operation S600, the authentication information has to be received from the external device 2000. If, in operation S600, the authentication information is not received from the external device 2000 and the authentication process for the external device 2000 is not performed, then operation S610 may be omitted.

However, in the case where the authentication process for the external device 2000 is performed, the first device 1000 may not perform a next process when the authentication information is not received from the external device 2000 or wrong authentication information is received from the external device 2000.

In operation S615, the first device 1000 displays information about the external device 2000. To this end, in operation S600, the external device 2000 may transmit the information about the external device 2000 to the first device 1000.

After the occurrence of the first local area communication is sensed, the first device 1000 may also receive the authentication information and the information about the external device 2000 from the external device 2000, as the first device 1000 requests information from the external device 2000.

When a user input, for selecting a connection to the external device 2000 based on the displayed information about the external device 2000, is received in operation S620, the first device 1000 determines a second local area communication method of the external device 2000 based on the information for connection to the second local area communication, in operation S625.

In operation S630, the first device 1000 may transmit information for a connection to the second local area communication, which may include of the first device 1000, which is needed when requesting a direct communication between devices, to the external device 2000 by using the BLE communication method. In this regards, the external device 2000 may first attempt a direct communication with the first device 1000 by using the information of the first device 1000, later.

However, operation S630 may not be performed so that only the first device 1000 may attempt the direct communication between devices.

In operation S635, the first device 1000 transmits a request for connection to the external device 2000 based on the information for connection to the second local area communication, which was received from the external device 2000. When, in operation S640, a signal indicating connection acceptance is received from the external device 2000, then, in operation S645, the first device 1000 executes an application.

In operation S650, the first device 1000 controls the external device 2000 by using the executed application. As the first device 1000 is connected to the external device 2000 to provide a service connection, the first device 1000 may control the external device 2000 by using the executed application and may provide a service together with the external device 2000.

Figure 7:
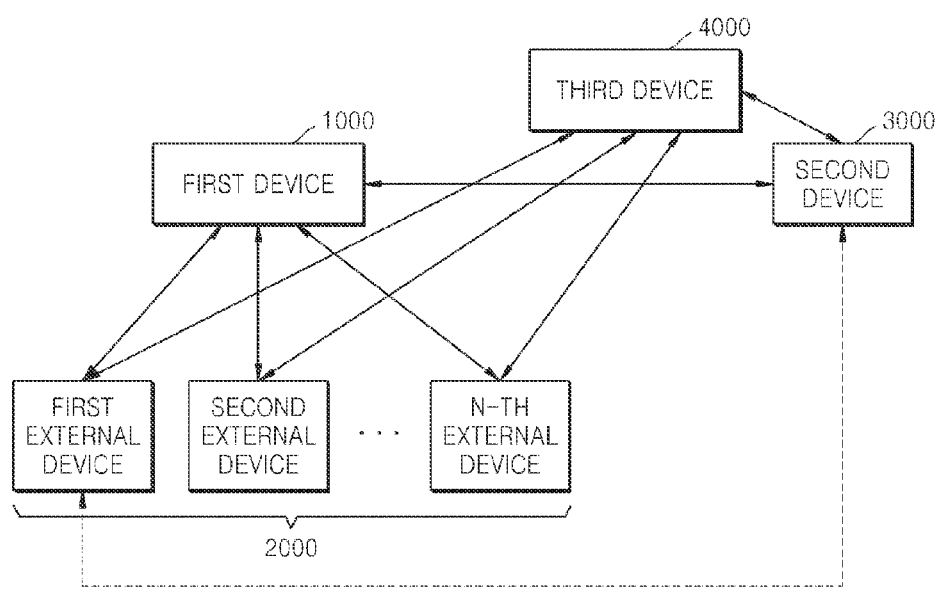
FIG. 7 is a schematic block diagram of an external device control system, in which a second device selects one of first and third devices as a repeater according to another embodiment of the present disclosure.

FIG. 7 is a schematic block diagram of an external device control system, in which a second device selects one of first and third devices as a repeater according to an embodiment of the present disclosure.

Referring to FIG. 7, the external device control system may include the first device 1000, the third device 4000, at least one external device 2000, and the second device 3000. The first device 1000 and the third device 4000 may be host devices, and the at least one external device 2000 may be a peripheral device that is connected to one of the host devices and controlled by the respective host device.

At least one of the first device 1000 and the third device 4000 is connected to the external device 2000 and may control the external device 2000, and may relay data transmission between the external device 2000 and the second device 3000.

The second device 3000 is physically connected to the external device 2000, and attempts a service connection with the external device 2000. When the second device 3000 fails to establish the service connection with the external device 2000, the second device 3000 may search for the first and third devices 1000 and 4000 connected to the external device 2000. Also, the second device 3000 may select at least one of the searched first and third devices 1000 and 4000 and may be connected to the selected device. The second device 3000 may request the selected device to relay data to the external device 2000.

The third device 4000 may be, for example, a smart phone, a mobile phone, a PDA, a laptop, a media player, a PC, a GPS device, or a mobile or non-mobile computing device. However, the present disclosure is not limited thereto, and the third device 4000 may be any suitable and/or similar electronic device. The third device 4000 may include a home appliance and/or any of various devices installed in a house. For example, the third device 4000 may include a television, a lighting fixture, a refrigerator, an audio apparatus, a washing machine, an oven, a gas stove, a home gateway, a game device, an electronic blackboard, or a touch table. However, the present disclosure is not limited thereto, and the third device 4000 may be any home appliance, device, and/or element that may be installed in a house and/or connected to a network.

Figure 8:
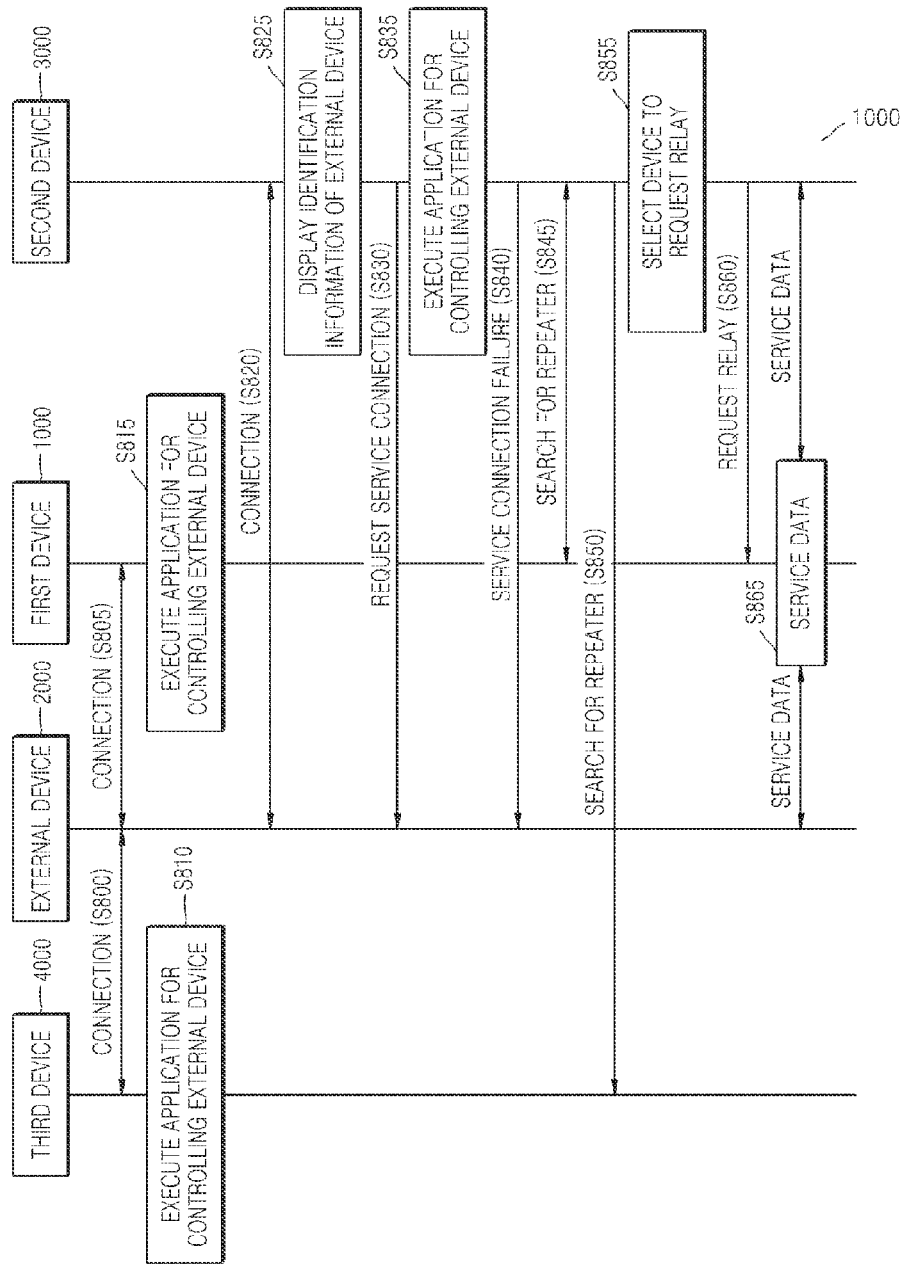
FIG. 8 is a flowchart illustrating a method in which, in the external device control system of FIG. 7, a second device selects a first device as a repeater and controls an external device connected to the first device according to an embodiment of the present disclosure.

FIG. 8 is a flowchart illustrating a method in which, in the external device control system of FIG. 7, a second device selects a first device from among the first and third devices as a repeater and controls the external device connected to the first device according to an embodiment of the present disclosure.

Referring to FIG. 8, in operation S800, the third device 4000 and the external device 2000 are connected to each other. The third device 4000 and the external device 2000 may be physically connected to each other. As the third device 4000 and the external device 2000 approach each other, the third device 4000 and the external device 2000 may sense the occurrence of a first local area communication. The external device 2000 may transmit an identification value of the external device 2000 to the third device 4000 via the first local area communication.

The external device 2000 may transmit information for connection to a second local area communication and may transmit application information related to the external device 2000 to the third device 4000, via the first local area communication.

The application information related to the external device 2000 may be information about an application for providing a service via the external device 2000. For example, the application information may include information about an application installed in the external device 2000 and information about an application for controlling the external device 2000. However, the present disclosure is not limited thereto.

In operation S805, the first device 1000 and the external device 2000 are connected to each other. The first device 1000 and the external device 2000 may be connected to each other in the same manner as described in operation S800.

In operation S810, the third device 4000 executes an application for controlling the external device 2000. The third device 4000 may be installed with the application for controlling the external device 2000 to execute the installed application, based on the application information received from the external device 2000. When the third device 4000 receives an application file as the application information from the external device 2000, the third device 4000 may execute the received application file. When the third device 4000 receives a link address for downloading an application, the third device 4000 may download an application file by using the received link address and may execute the downloaded application file.

When the third device 4000 may normally transmit and/or receive service data to and from the external device 2000 by using the executed application, a service connection between the third device 4000 and the external device 2000 is completed.

In operation S815, the first device 1000 executes an application for controlling the external device 2000. The first device 1000 may execute an application in the same manner as described in operation S810, and may be connected to the external device 2000 to provide a service connection.

In operation S820, the second device 3000 and the external device 2000 are connected to each other. In operation s820, the second device 3000 and the external device 2000 may be physically connected to each other.

In operation S825, the second device 3000 displays identification information of the external device 2000. In operation S830, the second device 3000 requests a service connection from the external device 2000. The second device 3000 may request the service connection from the external device 2000 by using the application executed in operation S835.

In operation S835, the second device 3000 executes an application for controlling the external device 2000. The second device 3000 may execute the application for controlling the external device 2000 based on a user input for connection with the external device 2000.

In operation S840, a service connection between the second device 3000 and the external device 2000 has failed. When a service protocol of the second device 3000 is different from that of the external device 2000, the service connection between the second device 3000 and the external device 2000 may be failed. For example, when an OS installed in the second device 3000 is different from that installed in the external device 2000, and thus the service protocol and the data format of the second device 3000 are different from those of the external device 2000, the service connection between the second device 3000 and the external device 2000 may be failed.

In operations 5845 and 5850, the second device 3000 searches for a repeater. When the service connection between the second device 3000 and the external device 2000 has failed, the second device 3000 may search for a repeater. The second device 3000 may determine that the failure of the service connection to the external device 2000 has occurred, and then may search for the first device 1000 that will relay service data to the external device 2000.

In operations 5820 through 5840, the case in which the service connection has failed after the second device 3000 is physically connected to the external device 2000, receives the application information received from the physically connected external device 2000, and attempts the service connection to the external device 2000 by using the application installed based on the application information has been explained. However, the present disclosure is not limited thereto. As the second device 3000 is physically connected to the external device 2000, the second device 3000 may determine whether the service connection to the external device 2000 is possible, based on the identification value of the external device 2000 which is received from the external device 2000. In this case, the second device 3000 may determine a type of service protocol and a data format that are used in the external device 2000, based on the identification value of the external device 2000. Also, the second device 3000 may determine whether the service connection to the external device 2000 is possible, by comparing the determined service protocol and data format of the external device 2000 with a service protocol and a data format of the second device 3000.

In operation S840 and S850, the second device 3000 may broadcast a service relay request to peripheral devices. The second device 3000 may broadcast information about the service protocol and the data format, which are used in the second device 3000, and information about the service protocol and the data format, which are used in the external device 2000, to the peripheral devices.

In operation S855, the second device 3000 selects a device to request relay, or in other words, the second device 300 selects a repeater. The first device 1000 and the third device 4000 may respectively transmit an acknowledge signal ACK to the second device 3000 in response to a relay request of the second device 3000. The second device 3000 may select the first device 1000, from among the first device 1000 and the third device 4000, to request a relay of service data.

In operation S860, the second device 3000 requests a relay of service data from the first device 1000. In operation S865, the first device 1000 relays service data that is transmitted between the second device 3000 and the external device 2000. The first device 1000 may convert service data, which is received from the second device 3000, in a form suitable for the external device 2000, and may transmit the converted service data to the external device 2000. Also, the first device 1000 may convert service data, which is received from the external device 2000, into a form suitable for the second device 3000, and may transmit the converted service data to the first device 1000.

Figure 9:
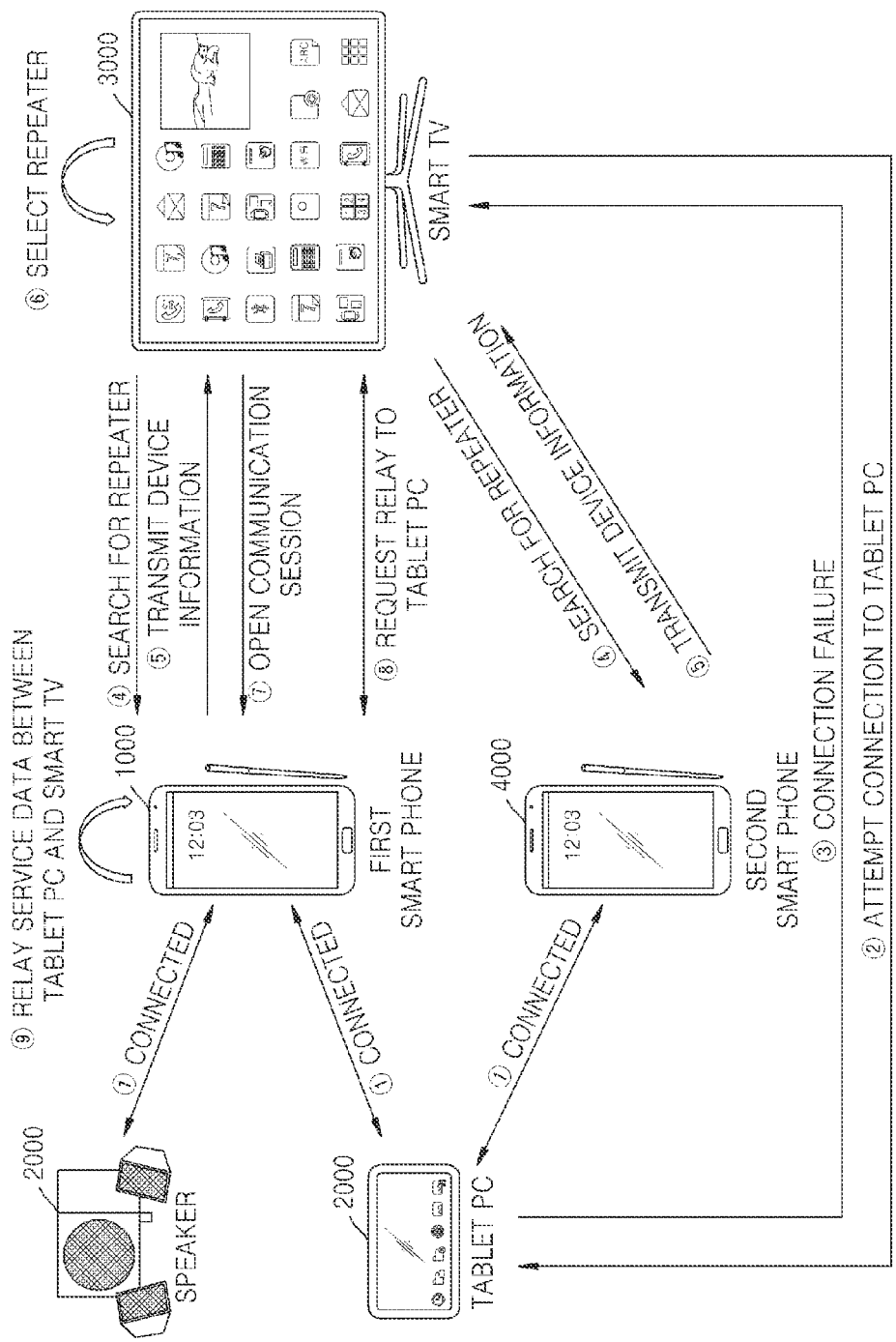
FIG. 9 is a diagram illustrating an example in which, in the external device control system of FIG. 7, a second device selects a first device as a repeater and controls an external device connected to the first device according to an embodiment of the present disclosure.

FIG. 9 is a diagram illustrating an example an example in which, in the external device control system of FIG. 7, a second device selects a first device as a repeater and controls the external device connected to the first device according to an embodiment of the present disclosure.

Referring to FIG. 9, a first smart phone may be the first device 1000, a second smart phone may be the third device 4000, a speaker and a tablet PC each may be the external device 2000, and a smart TV may be the second device 3000.

The first device 1000 is connected to the external devices 2000 to provide a physical connection and a service connection, and the first device 1000 and the external devices 2000 may provide a service to a user by transmitting and receiving service data to and from each other.

The second third device 4000 is connected to the external device 2000 that is the tablet PC to provide a physical connection and a service connection, and the third device 4000 and the external device 2000 that is the tablet PC may provide a service to a user by transmitting and receiving service data to and from each other.

Next, the second device 3000 may attempt the service connection to the external device 2000 that is the tablet PC, and may search for a repeater when the service connection has failed. The second device 3000 may search for the first device 1000 and the third device 4000. The second device 3000 may select the first device 1000, from among the searched first device 1000 and the third device 4000, as a repeater. Also, the second device 3000 may select the repeater based on device information that is received from the searched first device 1000 and the third device 4000.

In addition, a communication session between the first device 1000 and the second device 3000 may be opened, and the first device 1000 may relay service data between the second device 3000 and the external device 2000 that is the tablet PC in response to a relay request of the second device 3000.

Figure 10:
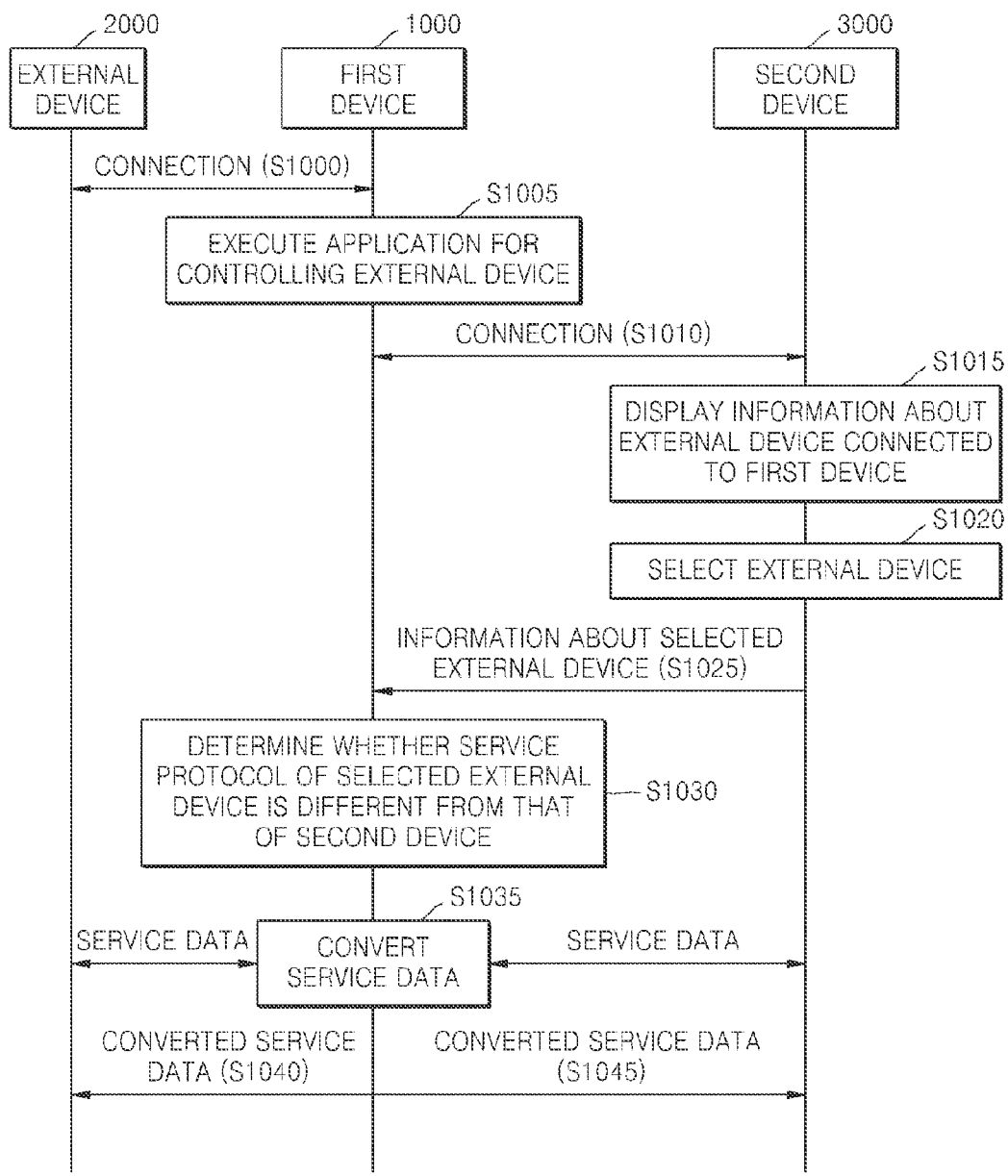
FIG. 10 is a flowchart illustrating a method in which, in the external device control system of FIG. 1 or FIG. 7, a second device selects one of external devices connected to a first device and the first device relays service data between the second device and the selected external device according to an embodiment of the present disclosure.

FIG. 10 is a flowchart illustrating a method in which, in the external device control system of FIG. 1 or FIG. 7, a second device selects one of external devices connected to a first device and the first device relays service data between the second device and the selected external device according to an embodiment of the present disclosure.

Referring to FIG. 10, in operation S1000, the first device 1000 is connected to the external device 2000. The first device 1000 and the external device 2000 may be physically connected to each other. As the first device 1000 and the external device 2000 approach each other, the first device 1000 and the external device 2000 may sense the occurrence of a first local area communication. The external device 2000 may transmit an identification value of the external device 2000 to the first device 1000 via the first local area communication. The identification value of the external device 2000 may include, for example, a Service Set Identifier (SSID), a model name, a product number, and a user Identification (ID) of the external device 2000. However, the present disclosure is not limited thereto. In addition, the external device 2000 may transmit information for connection to a second local area communication and application information related to the external device 2000 to the first device 1000, via the first local area communication. Examples of the first and second local area communications may include an NFC, a Bluetooth communication, and a WIFI communication. However, the present disclosure is not limited thereto, and the first and second local area communications may be any suitable and/or similar type of communication method, protocol, and/or system. The first local area communication and the second local area communication may be the same as each other, but the present disclosure is not limited thereto. The application information related to the external device 2000 may be information about an application for providing a service via the external device 2000. For example, the application information may include information about an application installed in the external device 2000 and information about an application for controlling the external device 2000. However, the present disclosure is not limited thereto.

In operation S1005, the first device 1000 executes an application for controlling the external device 2000. The first device 1000 may be installed with the application for controlling the external device 2000 to execute the installed application, based on the application information received from the external device 2000. When the first device 1000 receives an application file as the application information from the external device 2000, the first device 1000 may execute the received application file. When the first device 1000 receives a link address for downloading an application file, the first device 1000 may download an application file by using the received link address and may execute the downloaded application file.

When the first device 1000 may normally transmit and/or receive service data to and from the external device 2000 by using the executed application, a service connection between the first device 1000 and the external device 2000 is completed.

In operation S1010, the first device 1000 and the second device 3000 are connected to each other. As the first device 1000 and the second device 3000 approach each other, the first device 1000 and the second device 3000 may sense the occurrence of the first local area communication. The second device 3000 may transmit the identification value of the external device 2000 to the first device 1000 via the first local area communication. Also, the second device 3000 may transmit information for connection to the second local area communication and application information related to the external device 2000 to the first device 3000, via the first local area communication. The first device 1000 may transmit application information related to the first device 1000 to the second device 3000. An application for controlling the second device 3000 may be installed in the first device 1000, and an application for controlling the first device 1000 may be installed in the second device 3000.

In operation S1015, the second device 3000 displays information about the external device 2000 connected to the first device 1000. The second device 3000 may receive device information about at least one external device 2000 connected to the first device 1000 from the first device 1000, and may display a list of external devices on a screen of the second device 3000 based on the received device information.

In operation S1020, the second device 3000 selects an external device 2000. The second device 3000 may select an external device 2000 based on a user's selection input for the list of external devices, which is displayed on the screen of the second device 3000.

In operation S1025, the second device 3000 transmits device information about the selected external device 2000 to the first device 1000. For example, the second device 3000 may transmit an identification value of the selected external device 2000 to the first device 1000.

In operation S1030, the first device 1000 determines whether a service protocol of the selected external device 2000 is different from that of the second device 3000. For example, when an OS installed in the second device 3000 is different from that installed in the selected external device 2000, the service protocol of the selected external device 2000 may be different from that of the second device 3000. In addition, when a data format of the second device 3000 is different from that of the selected external device 2000, the service protocol of the selected external device 2000 may be different from that of the second device 3000. However, the present disclosure is not limited thereto.

In operation S1035, the first device 1000 converts service data into another form. That is, the first device 1000 may receive service data from the selected external device 2000, and may convert the received service data into a form suitable for the second device 2000. In detail, the first device 1000 may convert a format of the service data received from the external device 2000 into a data format of the second device 3000. Also, the first device 1000 may convert the service data received from the external device 2000 into a form suitable for a service protocol of the second device 3000.

The first device 1000 may receive service data from the second device 3000, and may convert the received data into a form suitable for the external device 2000. In detail, the first device 1000 may convert a format of the service data received from the second device 3000 into a data format of the external device 2000. Also, the first device 1000 may convert the service data received from the second device 3000 into a form suitable for a service protocol of the external device 2000.

In this case, the first device 1000 may analyze the service protocol of the external device 2000 and the service protocol of the second device 3000, and may determine the data format of the external device 2000 and the data format of the second device 3000.

In operations S1040, the first device 1000 transmits the converted service data of the second device 3000 to the external device 2000. In operation S1045, the first device 1000 transmits the converted service data of the external device 2000 to the second device 3000. The first device 1000 may provide the converted service data of the external device 2000 to the second device 3000 based on the service protocol of the second device 3000. Also, the first device 1000 may provide the converted service data of the second device 3000 to the external device 2000 based on the service protocol of the external device 2000.

Figure 11:
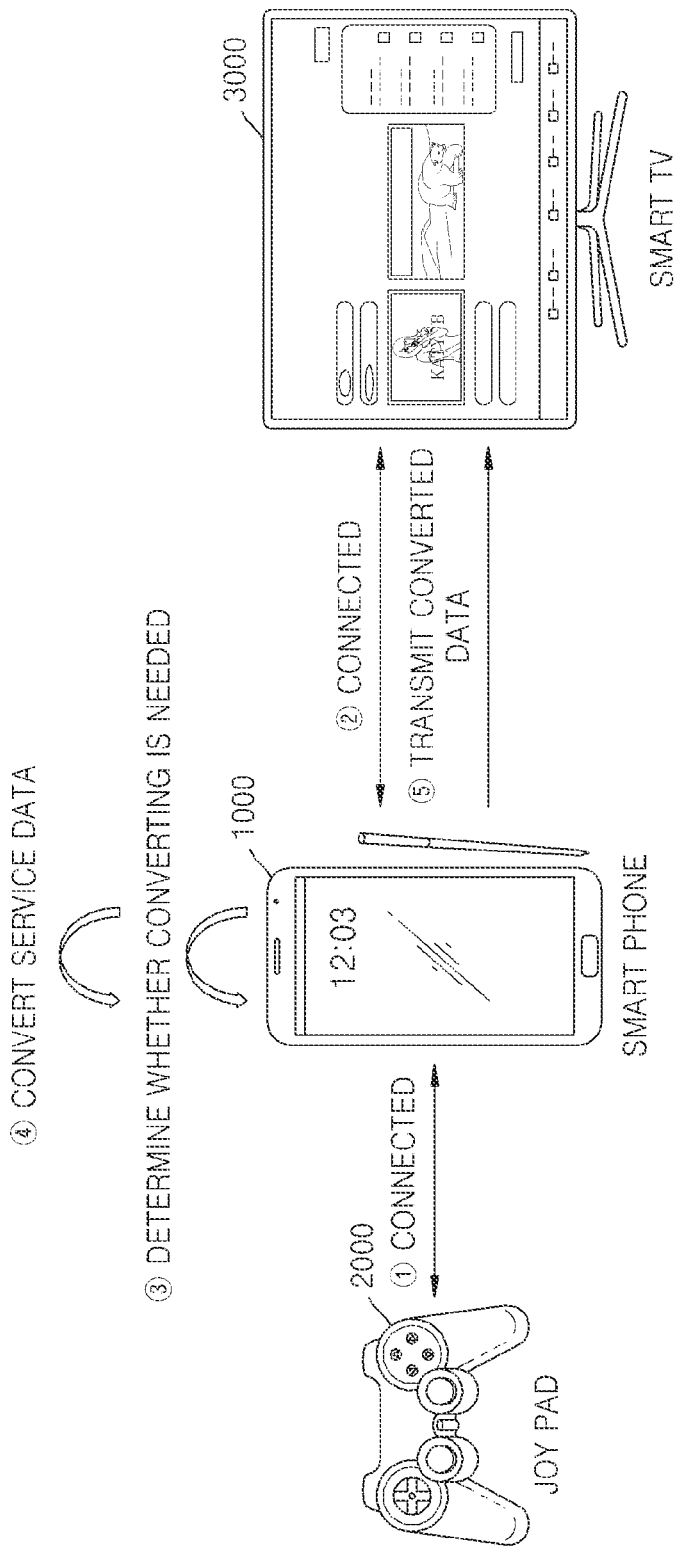
FIG. 11 is a diagram illustrating an example in which, in the external device control system of FIG. 1 or FIG. 7, a second device determines whether a conversion of service data is needed and relays service data between the second device and an the external device according to an embodiment of the present disclosure.

FIG. 11 is a diagram illustrating an example in which, in the external device control system of FIG. 1 or FIG. 7, a first device determines whether a conversion of service data is needed and relays the service data between a second device and the external device according to an embodiment of the present disclosure.

Referring to FIG. 11, a smart phone may be the first device 1000, a joy pad may be the external device 2000, and a smart TV may be the second device 3000.

The first device 1000 may be connected to the external device 2000 to provide a physical connection and a service connection, and the first device 1000 and the external device 2000 may provide a service to a user by transmitting and receiving service data to and from each other.

The first device 1000 may be connected to the second device 3000 to provide a physical connection and a service connection, and may determine whether the conversion of service data to be transmitted and/or received between the external device 2000 and the second device 3000 is needed. The first device 1000 may compare a service protocol of the external device 2000 with a service protocol of the second device 3000.

The first device 1000 may convert service data, which is received from the external device 2000, into a form suitable for the service protocol of the second device 3000, and may transmit the converted service data to the second device 3000.

Figure 12:
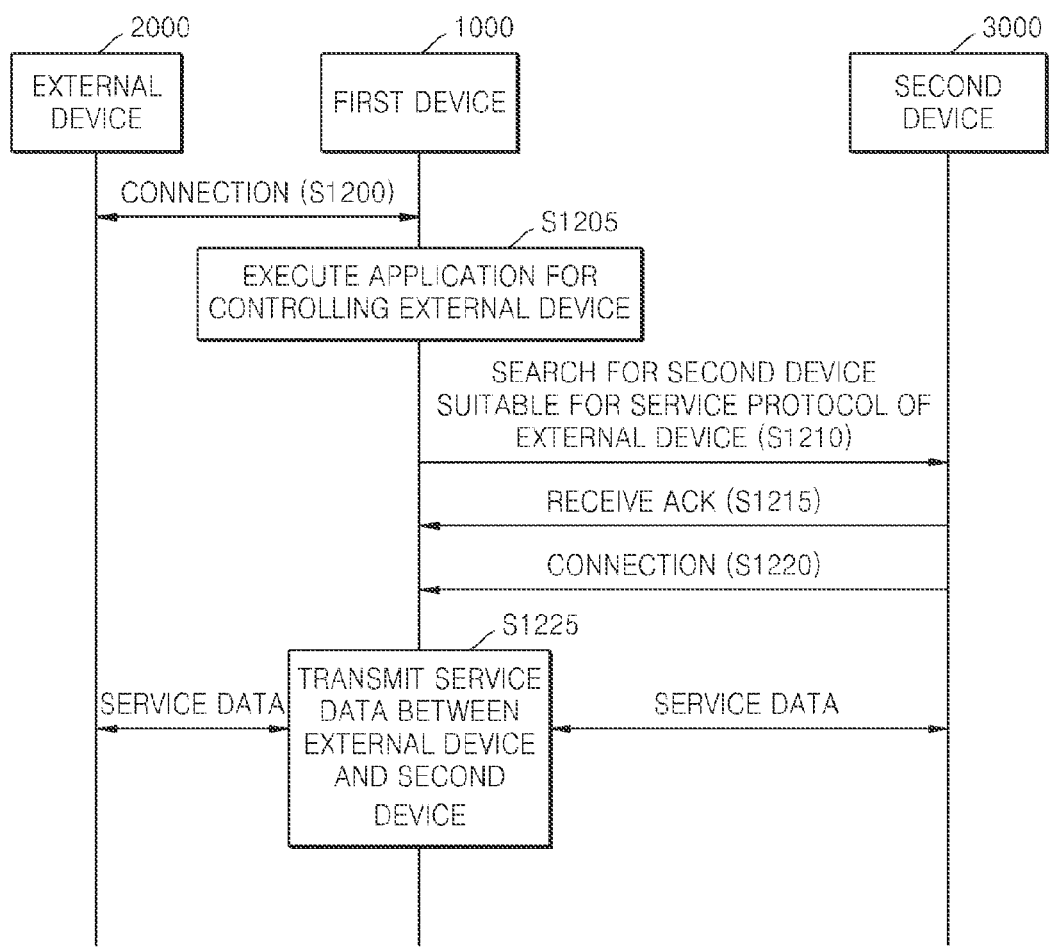
FIG. 12 is a flowchart illustrating a method in which, in the external device control system of FIG. 1 or FIG. 7, a first device delivers service data, which is transmitted and received between an external device and a second device without converting the service data according to an embodiment of the present disclosure.

FIG. 12 is a flowchart illustrating a method in which, in the external device control system of FIG. 1 or FIG. 7, a first device delivers service data, which is transmitted and received between an external device and a second device, without converting the service data according to an embodiment of the present disclosure.

In operation S1200, the first device 1000 is connected to the external device 2000. The first device 1000 and the external device 2000 may be physically connected to each other. As the first device 1000 and the external device 2000 approach each other, the first device 1000 and the external device 2000 may sense the occurrence of a first local area communication. The external device 2000 may transmit an identification value of the external device 2000 to the first device 1000 via the first local area communication. The identification value of the external device 2000 may include, for example, a SSID, a model name, a product number, and a user ID of the external device 2000. However, the present disclosure is not limited thereto.

In addition, the external device 2000 may transmit information for a connection to a second local area communication and application information related to the external device 2000 to the first device 1000, via the first local area communication. Examples of the first and second local area communications may include an NFC, a Bluetooth communication, and a WIFI communication. However, the present disclosure is not limited thereto. The first local area communication and the second local area communication may be the same as each other, but the present disclosure is not limited thereto.

The application information related to the external device 2000 may be information about an application for providing a service via the external device 2000. For example, the application information may include information about an application installed in the external device 2000 and information about an application for controlling the external device 2000. However, the present disclosure is not limited thereto.

In operation S1205, the first device 1000 executes an application for controlling the external device 2000. The first device 1000 may be installed with the application for controlling the external device 2000 to execute the installed application, based on the application information received from the external device 2000. When the first device 1000 receives an application file, as the application information, from the external device 2000, the first device 1000 may execute the received application file. When the first device 1000 receives a link address for downloading an application file, the first device 1000 may download an application file by using the received link address and may execute the downloaded application file.

When the first device 1000 may normally transmit and/or receive service data to and from the external device 2000 by using the executed application, a service connection between the first device 1000 and the external device 2000 is completed.

In operation S1210, the first device 1000 searches for the second device 3000 suitable for a service protocol of the external device 2000. The first device 1000 may broadcast information about the service protocol of the external device 2000 to peripheral devices. For example, the information about the service protocol of the external device 2000 may include information about a type of the service protocol of the external device 2000, a format of data that is used in the service protocol of the external device 2000, and a type of an OS installed in the external device 2000.

In operation S1215, the first device 1000 receives an acknowledge signal ACK from the second device 3000. The first device 1000 may determine whether a service protocol of the second device 3000 is the same as that of the external device 2000, based on the broadcasted information about the service protocol. The first device 1000 may determine whether it may transmit and/or receive service data to and from the external data 2000, based on the service protocol of the external device 2000. Also, the first device 1000 may determine whether an OS installed in the external device 2000 is the same as that installed in the second device 3000.

In operation S1220, the first device 1000 and the second device 3000 are connected to each other. The second device 3000 may transmit connection information of the second device 3000 to the first device 1000 while transmitting the acknowledge signal ACK to the first device 1000. The connection information of the second device 3000, which is information that is needed for connection to the second device 3000, may include information for connection to the second device via the NFC communication, the Bluetooth communication, or the WIFI communication. The first device 1000 may be connected to the second device 3000 by using the received connection information.

The second device 3000 may transmit information about an application of the second device 3000 to the first device

1000. The information about an application of the second device 3000 may be information about an application for providing a service via the second device 3000. For example, the application information may include link information for downloading an application installed in the second device 3000 and an application file installed in the second device 3000. However, the present disclosure is not limited thereto. Based on the received application information, the first device 1000 may be installed with an application and may execute the installed application.

In operation S1225, the first device 1000 transmits service data between the external device 2000 and the second device 3000. The first device 1000 may transmit the service data received from the external device 2000 to the second device 3000 without converting the service data. Also, the first device 1000 may transmit the service data received from the second device 3000 to the external device 2000 without converting the service data.

Figure 13:
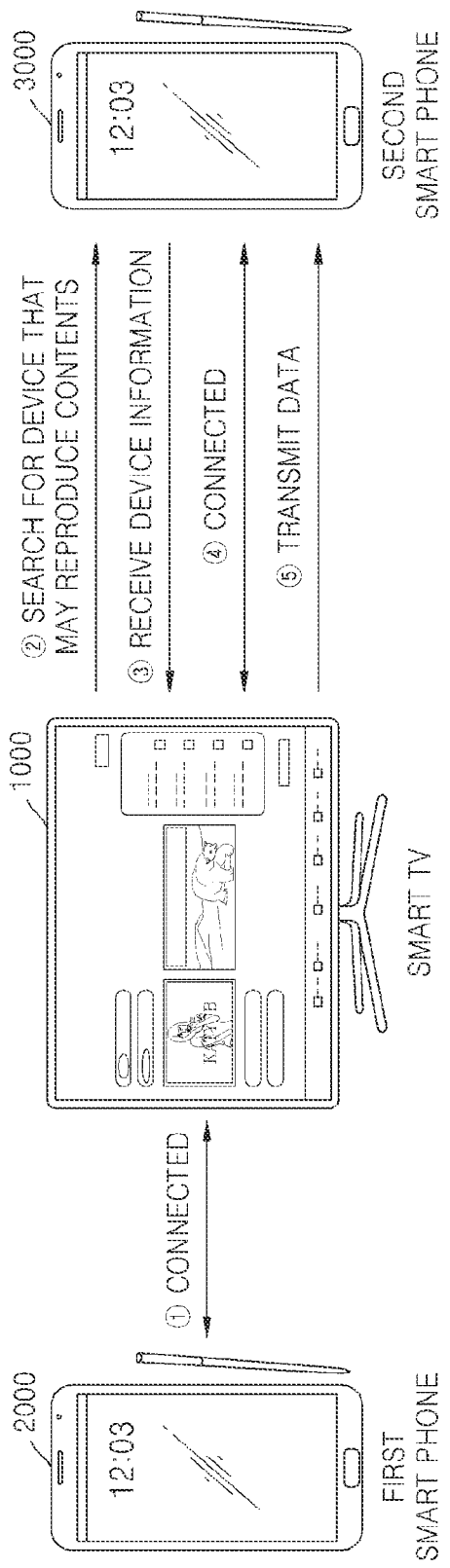
FIG. 13 is a diagram illustrating an example in which, in the external device control system of FIG. 1 or FIG. 7, a first device searches for a second device and delivers service data that is transmitted and received between an external device and the second device according to an embodiment of the present disclosure.

FIG. 13 is a diagram illustrating an example in which, in the external device control system of FIG. 1 or FIG. 7, a first device searches for a second device and delivers service data that is transmitted and received between an external device and the second device according to an embodiment of the present disclosure.

Referring to FIG. 13, a smart TV may be the first device 1000, a first smart phone may be the external device 2000, and a second smart phone may be the second device 3000.

The first device 1000 may be connected to the external device 2000, and may receive contents stored in the external device 2000 from the external device 2000 to reproduce the contents.

Next, the first device 1000 may search for a device that may reproduce the contents stored in the external device 2000. The first device 1000 may broadcast information about a service protocol of the external device 2000.

Next, the first device 1000 may be connected to the second device 3000 based on device information that is received from the second device 3000. Next, the first device 1000 may deliver service data, which is received from the external device 2000, to the second device 3000, and may deliver service data, which is received from the second device 3000, to the external device 2000.

Figure 14:
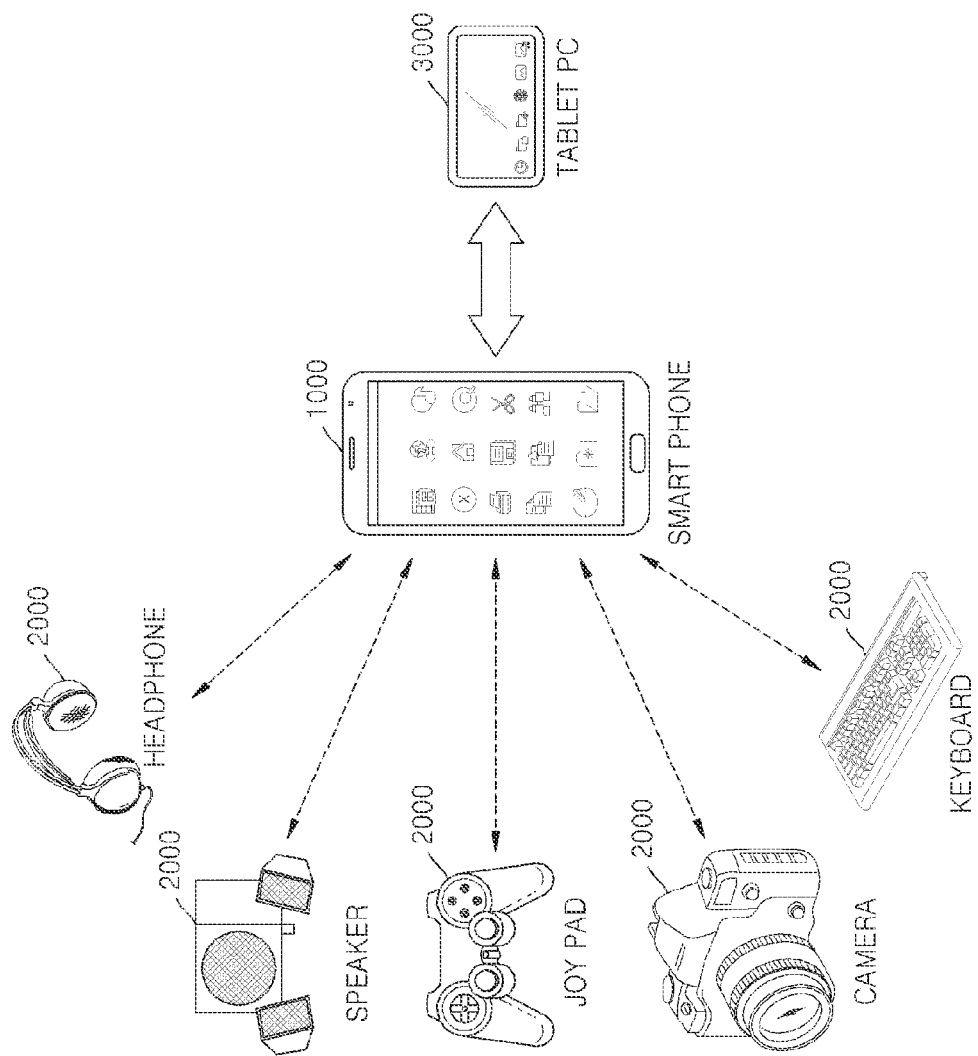
FIG. 14 is a diagram illustrating an example of the external device control system of FIG. 1 or FIG. 7 according to an embodiment of the present disclosure.

FIG. 14 is a diagram illustrating an example of the external device control system of FIG. 1 or FIG. 7 according to an embodiment of the present disclosure.

Referring to FIG. 14, a smart phone may be the first device 1000, and a headphone, a speaker, a joy pad, a camera, and a keyboard each may be the external device 2000. A tablet PC may be the second device 3000.

Referring to FIG. 14, the first device 1000 may relay service data, which is received from at least one of the external devices 2000, which includes the headphone, the speaker, the joy pad, the camera, and the keyboard, to the second device 2000 or may relay service data, which is received from the second device 2000, to at least one of the external devices 2000, which includes the headphone, the speaker, the joy pad, the camera, and the keyboard.

In this case, service protocols that are used in the external devices 2000, which include the headphone, the speaker, the joy pad, the camera, and the keyboard, respectively may be different from each other. For example, types of services that are used in the external devices 2000, including the headphone, the speaker, the joy pad, the camera, and the keyboard, respectively may be different from each other. Alternatively, data formats that are used in the external devices 2000, including the headphone, the speaker, the joy pad, the camera, and the keyboard, respectively may be different from each other.

In addition, the first device 1000 may convert the service data received from the second device 3000 into forms suitable for service protocols of the external devices 2000, including the headphone, speaker, joy pad, camera, and keyboard, respectively, and may transmit converted service data to the external devices 2000, including the headphone, the speaker, the joy pad, the camera, and the keyboard, respectively.

Thus, although services or the service protocols, which are used in the external devices 2000, including the headphone, the speaker, the joy pad, the camera, and the keyboard, respectively, are different from each other, the first device 1000 may effectively relay service data between the second device 3000 and the external devices 2000, including the headphone, the speaker, the joy pad, the camera, and/or the keyboard.

FIGS. 15A through 15C are diagrams illustrating an example of a user interface via which a user makes a second device attempt a connection to an external device and search for a repeater according to an embodiment of the present disclosure.

Referring to FIG. 15A, the second device 3000 may search for an external device to be connected, and may display a list of searched external devices on a screen. The second device 3000 may select an external device A, from among external devices A and B, based on a user input for the list of the external devices. In addition, the second device 3000 may attempt a service connection to the external device A.

Referring to FIG. 15B, when the service connection to the external device A has failed, the second device 3000 may display a user interface, which allows a user to determine whether to search for a repeater, on the screen. When a service protocol of the second device 3000 is different from that of the external device A, a service connection between the external device A and the second device 3000 may be failed. Based on a user input directing a search for a repeater, the second device 3000 may search for a repeater for relaying service data to the external device A.

Referring to FIG. 15C, the second device 3000 may display a list of repeaters on the screen. Based on a user input for the list of repeaters, the second device 3000 may select a device A, from among the device A and device B, as the repeater for relaying service data. The repeater for relaying service data may be the first device 1000 of FIG. 1 or FIG. 7. Next, the second device 3000 may request a relay of service data from the device A. The device A may convert service data, which is received from the second device 3000, into a form suitable for a service protocol of the external device A, and may transmit the converted service data to the external device A.

Figure 16:
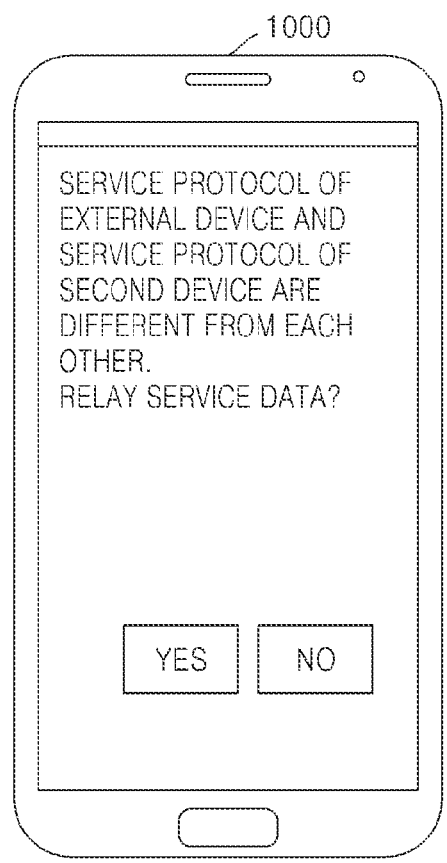
FIG. 16 is a diagram illustrating an example of a user interface via which a first device receives a user input for enabling a relay of service data between a second device and an external device after comparing a service protocol of the second device with a service protocol of the external device according to an embodiment of the present disclosure.

FIG. 16 is a diagram illustrating an example of a user interface via which a first device receives a user input for enabling a relay of service data between a second device and an external device after comparing a service protocol of the second device with a service protocol of the external device according to an embodiment of the present disclosure.

Referring to FIG. 16, the first device 1000 may search for the second device 3000, that will provide a service along with the external device 2000 connected to the first device 1000, and the first device 1000 may determine whether the service protocol of the external device 2000 and the service protocol of the second device 3000 are different from each other. When the service protocol of the external device 2000 and the service protocol of the second device 3000 are different from each other, the first device 1000 may display a user interface inquiring whether to relay service data between the external device 2000 and the second device 3000 on a screen thereof Based on a user input, the first device 1000 may convert service data, which is received from the second device 3000, into a form suitable for a service protocol of the external device 2000, and may transmit the converted service data to the external device 2000.

Figure 17A:
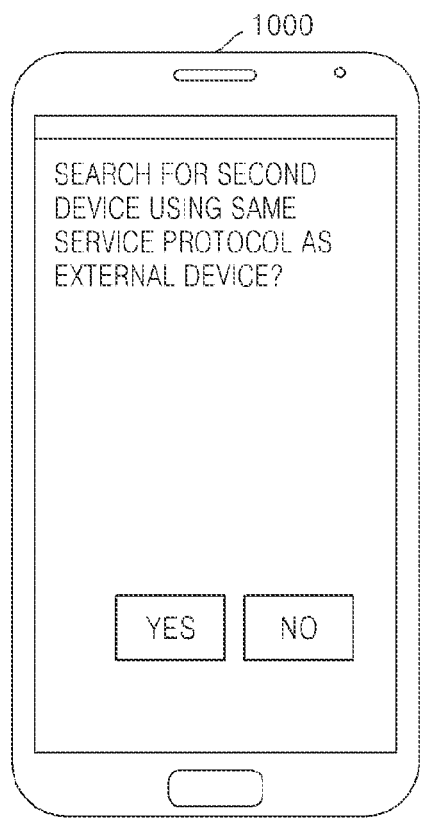
FIGS. 17A and 17B are diagrams illustrating an example of a user interface via which a user makes a first device search for and select a second device having a same protocol as an external device according to an embodiment of the present disclosure.
Figure 17B:
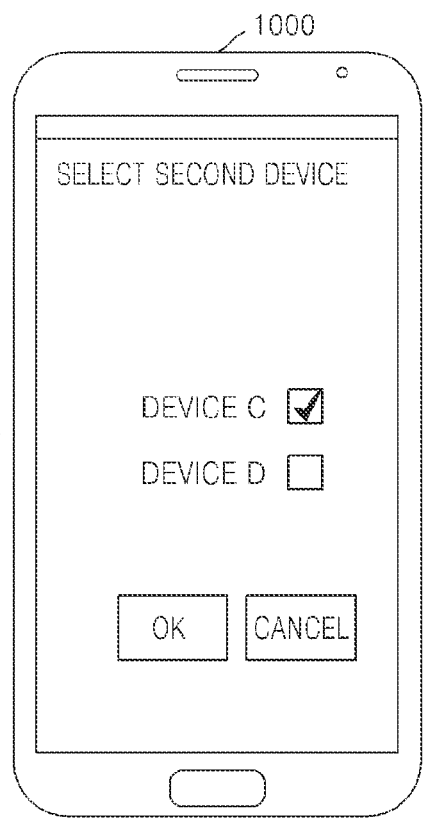

FIGS. 17A and 17B are diagrams illustrating an example of a user interface via which a user makes a first device search for and select a second device having a same protocol as an external device according to an embodiment of the present disclosure.

Referring to FIG. 17A, the first device 1000 may inquire of a user whether to search for the second device 3000 using the same protocol as the external device 2000 so that the second device 3000 provides a service along with the external device 2000 connected to the first device 1000.

Referring to FIG. 17B, the first device 1000 may display a list of devices using a protocol, which is the same as that of the external device 2000, on a screen thereof, and may select device C to be the second device 3000 based on a user input for the list of devices. Next, the first device 1000 may deliver service data, which is received from the external device 2000, to the second device 3000 without converting the service data, and may deliver service data, which is received from the second device 3000, to the external device 2000 without converting the service data.

Figure 18A:
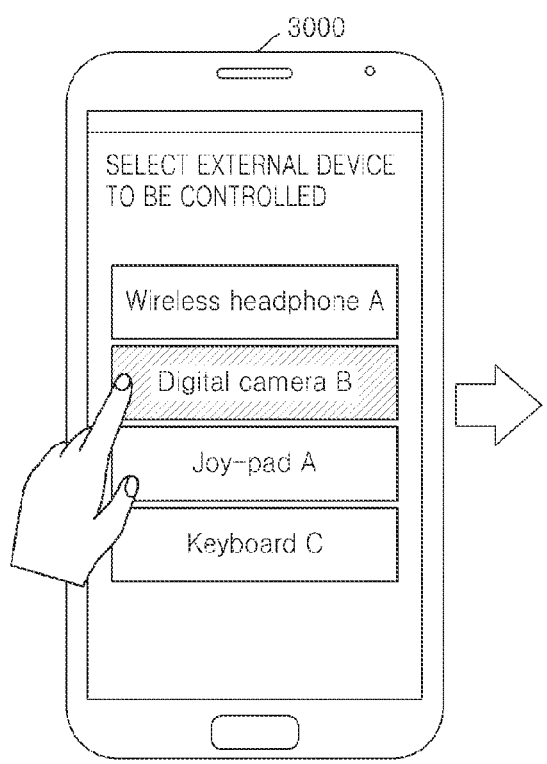
FIGS. 18A and 18B are diagrams illustrating an example in which a second device provides a service along with an external device according to an embodiment of the present disclosure.
Figure 18B:
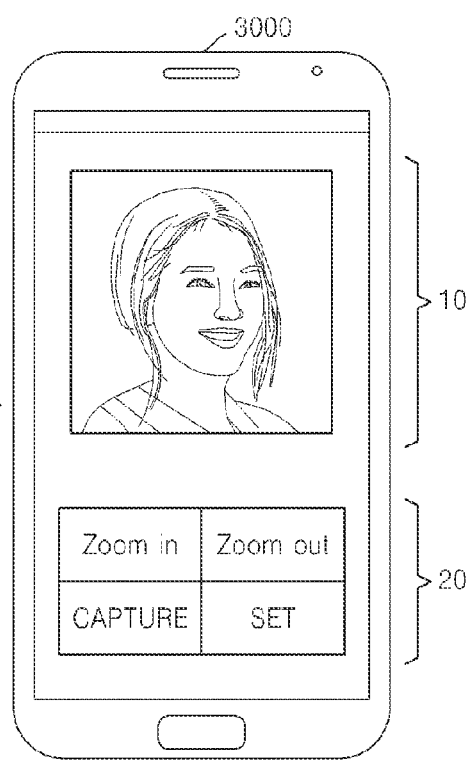

FIGS. 18A and 18B are diagrams illustrating an example in which a second device provides a service along with an external device according to an embodiment of the present disclosure.

Referring to FIG. 18A, the second device 3000 may search for at least one external device, i.e., the external device 2000, to provide a service along with the searched external device, and may display a list of searched external devices. For example, a list of external devices, such as "Wireless headphone A", "Digital camera B", "Joy-pad A", and "Keyboard C", may be displayed on a screen of the second device 3000.

When a user selects "Digital camera B" in the displayed list, an image 10 captured by "Digital camera B" and a menu 20 for controlling "Digital camera B" may be displayed on the screen, as shown in FIG. 18B.

Figure 19:
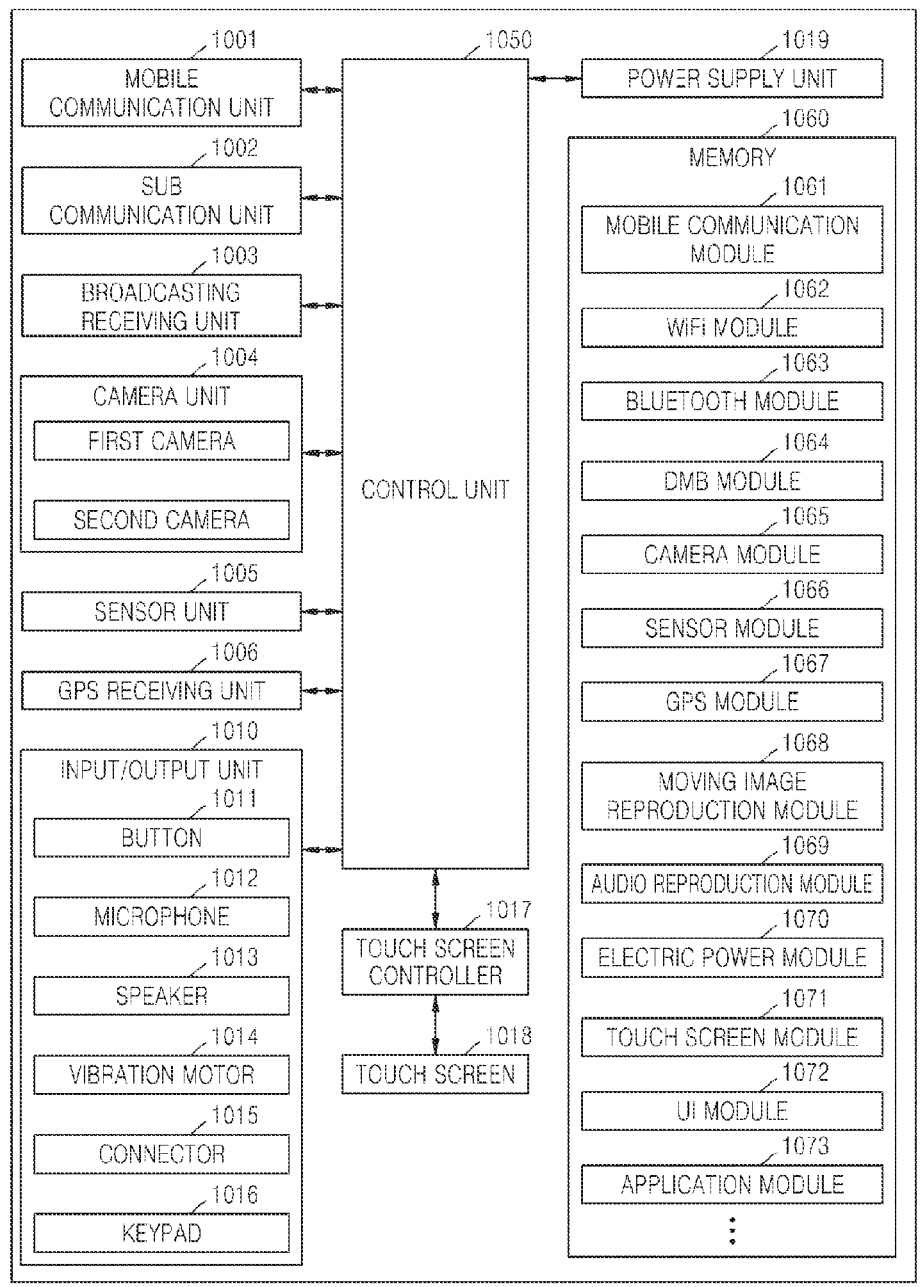
FIG. 19 is a block diagram of a device according to an embodiment of the present disclosure.

FIG. 19 is a block diagram of a device according to an embodiment of the present disclosure.

Referring to FIG. 19, the device shown in FIG. 19 may be the first device 1000 or the second device 3000 shown in FIG. 1 or FIG. 7.

A mobile communication unit 1001 performs a call set-up with a base station and performs data communication via a cellular network such as a $3^{rd}$ Generation (3G) network, a $4^{th}$ Generation (4G) network, or any other similar and/or suitable cellular and/or wireless communication networks and/or systems. A sub-communication unit 1002 performs functions for local area communication, such as Bluetooth communication, NFC, Wi-Fi communication, or any other similar and/or suitable type of local area communication. A broadcasting unit 1003 receives Digital Multimedia Broadcasting (DMB) signals.

A camera unit 1004 includes a lens for taking pictures or moving pictures, and optical devices used for capturing an image, and may include a first camera and a second camera.

A sensor unit 1005 may include a gravity sensor for sensing motion of the device, an illumination sensor for sensing brightness of light, a proximity sensor for sensing proximity of a human being, a motion sensor for sensing movement of a human being, and any other sensor that may be suitable and/or similar for sensing information and/or data that may be used by the first device 1000 or the second device 3000 shown in FIG. 1 or FIG. 7.

A Global Positioning System (GPS) receiver 1006 receives GPS signals from a satellite. Various services may be provided to the user via the GPS signals.

An input/output unit 1010 provides an interface with an external device or a human being. The input/output unit 1010 includes a button 1011, a microphone 1012, a speaker 1013, a vibration motor 1014, a connector 1015, and a keypad 1016.

A touch screen 1018 receives a touch input of the user. A touch screen controller 1017 transfers the touch input that is input through the touch screen 1018 to a controller 1050. A power supply unit 1019 is connected to a battery or an external power source in order to supply electric power used by the device.

The controller 1050 executes programs stored in a memory 1060 to request settlement or to perform settlement.

The programs stored in the memory 1060 may be classified into a plurality of modules according to functions thereof, that is, the memory 1060 may include a plurality of modules including a mobile communication module 1061, a Wi-Fi module 1062, a Bluetooth module 1063, a DMB module 1064, a camera module 1065, a sensor module 1066, a GPS module 1067, a moving image reproduction module 1068, an audio reproduction module 1069, an electric power module 1070, a touch screen module 1071, a UI module 1072, an application module 1073, and any other similar and/or suitable module that may be included in the memory 1060.

Functions of each module may be intuitively construed by one of ordinary skill in the art from the names thereof, and thus, only the application module 1073 will be described.

When the device of FIG. 19 is the second device 3000, the application module 1073 attempts a service connection to the external device 2000 and searches for the first device 1000, which will relay service data, when the service connection has failed. Also, the application module 1073 may transmit and/or receive the service data to or from the external device 2000 via the first device 1000.

In detail, the application module 1073 may be physically connected to the external device 2000 by using at least one of the mobile communication unit 1001 and the sub-communication unit 1002. Also, the application module 1073 may be installed with an application for controlling the external device 2000 to execute the application, and may request a service connection from the external device 2000.

When a service connection between the second device 3000 and the external device 2000 has failed, the application module 1073 may search for a repeater. As the service connection to the external device 2000 has failed, the second device 3000 may search for a repeater. The second device 3000 may determine the failure of the service connection to the external device 2000, and then may search for the first device 1000, which will relay service data to the external device 2000, by using at least one of the mobile communication unit 1001 and the sub-communication unit 1002.

In this case, the application module 1073 may broadcast device information of the second device 3000 and device information of the external device 2000 to peripheral devices. As the second device 3000 is physically connected to the external device 2000, the application module 1073 may determine whether the service connection to the external device 2000 is possible, based on an identification value of the external device 2000, which is received from the external device 2000. In this case, the application module 1073 may determine a type of service protocol and a data format that are used in the external device 2000, based on the identification value of the external device 2000. Also, the application module 1073 may determine whether the service connection to the external device 2000 is possible, by comparing the determined service protocol and data format of the external device 2000 with a service protocol and a data format of the application module 1073.

Based on broadcasted device information, the first device 1000 and the third device 4000 may transmit an acknowledge signal ACK to the second device 3000. In this case, the application module 1073 may select the first device 1000, from among the first device 1000 and the third device 4000, to request a relay of service data.

The application module 1073 may request a relay of service data from the first device 1000, and may transmit the service data to the first device. Thus, the first device 1000 may convert service data, which is received from the second device 3000, into a form suitable for the external device 2000, and may transmit the converted service data to the external device 2000.

The application module 1073 may request a relay of service data from the first device 1000 without attempting a service connection to the external device 2000. The application module 1073 may receive a list of external devices from the first device 1000 and may select an external device 2000, and may request the first device to relay service data to the selected external device 2000.

A case in which the device of FIG. 19 is the first device 1000 is described below.

When the device of FIG. 19 is the first device 1000, the application module 1073 may receive device information of the external device 2000 and may receive device information of the second device 3000 from the second device 3000, and may determine whether to relay service data between the external device 2000 and the second device 3000. The first device 1000 may transmit an acknowledge signal ACK to the second device 3000 to relay service data. The first device 1000 may receive service data from the second device 3000, may convert the service data received from the second device 3000 into a form suitable for a service protocol of the external device 2000, and may transmit the converted service data to the external device 2000. Also, the first device 1000 may receive service data from external device 2000, may convert the service data received from the external device 2000 into a form suitable for a service protocol of the second device 3000, and may transmit the converted service data to the second device 3000.

When the second device 3000 is connected to the first device 1000, the application module 1073 may transmit a list, the list including at least one external device 2000 connected to the first device 1000, to the second device 3000. The first device 1000 may receive an identification value of an external device 2000 selected by the second device 3000, and may determine whether the service protocol of the second device 3000 is different from that of the external device 2000 selected by the first device 1000. When the service protocol of the second device 3000 is different from that of the external device 2000 selected by the first device 1000, the first device 1000 may convert the service data received from the second device 3000 into a form suitable for the service protocol of the external device 2000. When the service protocol of the second device 3000 is not different from that of the external device 2000 selected by the first device 1000, the first device 1000 may deliver the service data received from the second device 3000 to the external device 2000.

Although a function of the application module 1073 is generally described above for convenience, the present disclosure is not limited thereto and a detailed function of the application module 1073 may be construed from FIGS. 1 through FIG. 19.

The one or more various embodiments of the present disclosure can also be embodied as computer-readable codes on a non-volatile computer readable recording medium. The non-volatile computer-readable recording medium is any data storage device that can store data which can be thereafter read by a computer system. Examples of the non-volatile computer-readable recording medium include Read-Only Memory (ROM), Random-Access Memory (RAM), Compact Disc (CD)-ROMs, magnetic tapes, floppy disks, optical data storage devices, etc. The non-volatile computer-readable recording medium can also be distributed over network coupled computer systems so that the computer-readable code is stored and executed in a distributed fashion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing a service from a second device to an external device via a first device, the method comprising:
    forming a service connection between the first device and the external device;
    if a service connection between the second device and the external device fails due to a difference in protocols, searching for the first device to relay service data from the second device to the external device;
    transmitting a relay request signal to the first device;
    transmitting the service data for the external device to the first device; and
    forming the service connection with the external device via the first device that converts the service data of the second device and provides the converted service data to the external device,
    wherein the transmitted service data is converted by the first device based on the service protocol of the external device and the service data is related to a control of the external device.

2. The method of claim 1, wherein the service protocol of the second device and the service protocol of the external device are distinguished from each other according to at least one of respective types of Operating Systems (OSs) installed in the second device and the external device, respective types of services that are provided by the second device and the external device, and respective formats of data that are used by the second device and the external device.

3. The method of claim 1, further comprising:
    physically connecting the second device with the at least one external device; and
    requesting a service connection from the physically connected at least one external device.

4. The method of claim 3, wherein the requesting of the service connection comprises installing an application providing a control of the external device into the second device and requesting the service connection via the installed application.

5. The method of claim 1, wherein the searching for the first device comprises searching for the first device by broadcasting device information of the second device and by broadcasting information about a service to be provided from the second device.

6. The method of claim 1, wherein the searching for the first device comprises searching for the first device by broadcasting device information of the second device and device information of the external device.

7. The method of claim 1, wherein the service data is generated by an application related to a control of the external device.

8. A method in which a first device relays service data between a second device and an external device, the method comprising:
   forming a service connection between the first device and at least one external device;
   if a service connection between the second device and the external device fails due to a difference in protocols, searching for the first device to relay service data from the second device to the external device;
   receiving, from the second device, a relay request signal for requesting a relay of service data for at least one external device;
   comparing a service protocol of the external device and a service protocol of the second device;
   converting service data received from the second device into a form suitable for the service protocol of the external device when the service protocol of the external device is different from that of the second device; and
   transmitting the converted service data to the external device,
   wherein the transmitted service data is converted by the first device based on the service protocol of the external device and the service data is related to a control of the external device.

9. The method of claim 8, wherein the receiving of the relay request signal comprises receiving the relay request signal from the second device when the second device fails to establish a service connection to the external device.

10. The method of claim 9, wherein it is determined that the service connection has failed when a service protocol of the second device is different from that of the external device.

11. The method of claim 10, wherein the service protocol of the second device and the service protocol of the external device are distinguished from each other according to at least one of respective types of Operating Systems (OSs) installed in the second device and the external device, respective types of services that are provided by the second device and the external device, and respective formats of data that are used by the second device and the external device.

12. The method of claim 8, further comprising:
   receiving device information of the second device and information about a service to be provided from the second device, which are broadcasted from the second device; and
   transmitting an acknowledge signal to the second device, based on the received device information of the second device and the received information about a service to be provided from the second device,
   wherein the relay request signal is received from the second device based on the acknowledge signal.

13. The method of claim 8, further comprising:
   receiving device information of the second device and device information of the external device, which are broadcasted from the second device; and
   transmitting an acknowledge signal to the second device, based on the received device information of the second device and the received device information of the external device,
   wherein the relay request signal is received from the second device based on the acknowledge signal.

14. The method of claim 8, wherein the service data is generated in the second device by an application providing a control of the external device.

15. The method of claim 8, wherein the at least one external device is connected to the first device.

16. The method of claim 8, further comprising providing a list of the at least one external device to the second device,
   wherein the receiving of the relay request signal comprises receiving a relay request signal for an external device selected by the second device from among the list of the at least one external device.

17. A second device for providing a service from a second device to an external device via a first device, the second device comprising:
   a memory in which at least one program is stored; and
   a processor configured to execute the at least one program to provide the service along with the external device via the first device,
   wherein the at least one program comprises commands executing:
      forming a service connection between the first device and the external device,
      if a service connection between the second device and the external device fails due to a difference in protocols, searching for the first device to relay service data from the second device to the external device,
      transmitting a relay request signal to the first device,
      transmitting the service data for the external device to the first device, and
      forming the service connection with the external device via the first device that converts the service data of the second device and provides the converted service data to the external device, and
   wherein the transmitted service data is converted by the first device based on the service protocol of the external device and the service data is related to a control of the external device.

18. The second device of claim 17, wherein the service protocol of the second device and the service protocol of the external device are distinguished from each other according to at least one of respective types of Operating Systems (OSs) installed in the second device and the external device, respective types of services that are provided by the second device and the external device, and respective formats of data that are used by the second device and the external device.

19. The second device of claim 17, wherein the at least one7 program further comprises commands executing:
   physically connecting the second device with the at least one external device; and
   requesting a service connection from the physically connected at least one external device.

20. The second device of claim 19, wherein the requesting of the service connection comprises installing an application providing a control of the external device into the second device and requesting the service connection via the installed application.

21. The second device of claim 17, wherein the searching for the first device comprises searching for the first device by broadcasting device information of the second device and information about a service to be provided from the second device.

22. The second device of claim 17, wherein the searching for the first device comprises searching for the first device by broadcasting device information of the second device and device information of the external device.

23. The second device of claim 17, wherein the service data is generated by an application providing a control of the external device.

24. A first device for relaying service data between a second device and an external device, the first device comprising:
 a memory in which at least one program is stored; and
 a processor configured to execute the at least one program to relay the service data between the second device and the external device,
 wherein the at least one program comprises commands executing:
  forming a service connection between the first device and the external device,
  if a service connection between the second device and the external device fails due to a difference in protocols, searching for the first device to relay service data from the second device to the external device,
  receiving, from the second device, a relay request signal for requesting a relay of service data for at least one external device,
  comparing a service protocol of the external device and a service protocol of the second device,
  converting service data received from the second device into a form suitable for the service protocol of the external device when the service protocol of the external device is different from that of the second device, and
  transmitting the converted service data to the external device, and
 wherein the transmitted service data is converted by the first device based on the service protocol of the external device and the service data is related to a control of the external device.

25. The first device of claim 24, wherein the receiving of the relay request signal comprises receiving the relay request signal from the second device when the second device fails to establish a service connection to the external device.

26. The first device of claim 25, wherein it is determined that the service connection has failed when a service protocol of the second device is different from that of the external device.

27. The first device of claim 26, wherein the service protocol of the second device and the service protocol of the external device are distinguished from each other according to at least one of respective types of Operating Systems (OSs) installed in the second device and the external device, respective types of services that are provided by the second device and the external device, and respective formats of data that are used by the second device and the external device.

28. The first device of claim 24, wherein the at least one program further comprises commands executing:
 receiving device information of the second device and information about a service to be provided from the second device, which are broadcasted from the second device; and
 transmitting an acknowledge signal to the second device, based on the received device information of the second device and the received information about a service to be provided from the second device,
 wherein the relay request signal is received from the second device based on the acknowledge signal.

29. The first device of claim 24, wherein the at least one program further comprises commands executing:
 receiving device information of the second device and device information of the external device, which are broadcasted from the second device; and
 transmitting an acknowledge signal to the second device, based on the received device information of the second device and the received device information of the external device,
 wherein the relay request signal is received from the second device based on the acknowledge signal.

30. The first device of claim 24, wherein the service data is generated in the second device by an application providing a control of the external device.

31. The first device of claim 24, wherein the at least one external device is connected to the first device.

32. The first device of claim 24,
 wherein the at least one program further comprises commands executing providing a list of the at least one external device to the second device, and
 wherein the receiving of the relay request signal comprises receiving a relay request signal for an external device selected by the second device from among the list of the at least one external device.

33. A non-transitory computer-readable recording medium having recorded thereon a program for executing the method of claim 1.

34. A non-transitory computer-readable recording medium having recorded thereon a program for executing the method of claim 8.

* * * * *